(12) United States Patent
Nakamura et al.

(10) Patent No.: US 8,568,274 B2
(45) Date of Patent: Oct. 29, 2013

(54) HYDRAULIC PRESSURE SUPPLY CONTROL APPARATUS FOR AUTOMOBILE

(75) Inventors: Kazuaki Nakamura, Toyota (JP); Toshimitsu Sato, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 661 days.

(21) Appl. No.: 12/921,518

(22) PCT Filed: Sep. 28, 2009

(86) PCT No.: PCT/JP2009/066768
§ 371 (c)(1),
(2), (4) Date: Sep. 8, 2010

(87) PCT Pub. No.: WO2010/041563
PCT Pub. Date: Apr. 15, 2010

(65) Prior Publication Data
US 2011/0034299 A1    Feb. 10, 2011

(30) Foreign Application Priority Data
Oct. 10, 2008    (JP) .................................. 2008-264493

(51) Int. Cl.
*F16H 61/00*    (2006.01)
(52) U.S. Cl.
USPC ........................................................ 477/143

(58) Field of Classification Search
None
See application file for complete search history.

(56) References Cited

U.S. PATENT DOCUMENTS 6,739,305 B2 *   5/2004   Takahara et al. .......... 123/196 R
7,575,111 B2     8/2009   Ogata et al.

FOREIGN PATENT DOCUMENTS

| JP | 10 324177   | 12/1998 |
|----|-------------|---------|
| JP | 11 93721    | 4/1999  |
| JP | 2003 39988  | 2/2003  |
| JP | 2006 69838  | 3/2008  |
| JP | 2008 51316  | 3/2008  |
| JP | 2009 133332 | 6/2009  |

* cited by examiner

*Primary Examiner* — Erin D Bishop
(74) *Attorney, Agent, or Firm* — Oblon, Spivak, McClelland, Maier & Neustadt, L.L.P.

(57) ABSTRACT

In one embodiment, a hydraulic pressure control circuit (4) of an automatic transmission includes a mechanical oil pump (MOP) and an electrical oil pump (EOP). The discharge side of the electrical oil pump (EOP) is caused to be in communication with the direct upstream side of a hydraulic pressure servo of a first clutch (C1) via a shunt hydraulic pressure supply passage (430). At the time of idle reduction, a linear solenoid (411) on the upstream side of the first clutch (C1) is caused to enter a forced closure state, thus preventing oil from the electrical oil pump (EOP) from flowing to a manual shift valve (410) side.

16 Claims, 8 Drawing Sheets

FIG.3

| SHIFT POSITION | SOLENOID | | | | | | ENGAGING ELEMENT | | | | | | |
|---|---|---|---|---|---|---|---|---|---|---|---|---|---|
| | SL1 | SL2 | SL3 | SL4 | SLU | SL | C1 | C2 | B1 | B2 | B3 | F1 | L/C |
| P | ○ | × | × | × | × | × | × | × | × | × | × | × | × |
| R | × | × | × | ○ | × | ◎ | × | × | × | ○ | ○ | × | × |
| R-PROHIBITED | × | × | × | × | ○ | ○ | × | × | × | × | × | × | × |
| N | ○ | × | × | × | × | × | × | × | × | × | × | × | × |
| 1st ON | ○ | × | × | × | △ | ○ | ○ | × | × | × | × | ○ | △ |
| 1st OFF | ○ | × | × | × | × | × | ○ | × | × | × | × | ○ | × |
| EGB | ○ | × | × | × | ○ | × | ○ | × | × | ○ | × | △ | × |
| 2nd | ○ | × | ○ | × | △ | ○ | ○ | × | ○ | × | × | × | △ |
| 3rd | ○ | × | × | ○ | △ | ○ | ○ | × | × | × | ○ | × | △ |
| 4th | ○ | ○ | × | × | △ | ○ | ○ | ○ | × | × | × | × | △ |
| 5th | × | ○ | × | ○ | △ | ○ | × | ○ | × | × | ○ | × | △ |
| 6th | × | ○ | ○ | × | △ | ○ | × | ○ | ○ | × | × | × | △ |

○ ENGAGE
× RELEASE
◎ ENGAGE DURING ENGINE BRAKING
△ ENGAGE ONLY DURING DRIVING
EGB : ENGINE BRAKING

HYDRAULIC PRESSURE SUPPLY CONTROL APPARATUS FOR AUTOMOBILE

TECHNICAL FIELD

The present invention relates to a hydraulic pressure supply control apparatus for supplying hydraulic pressure to a friction engaging element in a transmission mounted in an automobile. In particular, the present invention relates to an improvement in a hydraulic pressure supply operation performed in an automobile in which an internal combustion engine (hereinafter, called the "engine") is automatically stopped at the time of idle running of the engine.

BACKGROUND ART

When an automobile traveling in an urban area or the like stops to wait for a traffic light at an intersection or the like, the engine enters an idle running state, and fuel is wasted in this state. In light of this, conventionally so-called "idle reduction control" (e.g., see Patent Literature 1 to 3 below) is performed in which, if a certain condition such as the automobile stopping is established, the supply of fuel to the combustion chamber is stopped (so-called "fuel cut"), thus stopping the engine.

Also, if a predetermined engine start condition (e.g., in an automatic transmission vehicle, a brake pedal release operation or the like) is established while the engine is in the stopped state (hereinafter, this state is called the "idle reduction state") according to the "idle reduction control", a starter mechanism is driven, and the driving force thereof is transmitted to the engine (so-called "cranking"), thus restarting the engine and enabling startup of the vehicle. In this case, with an automatic transmission vehicle, starting up the vehicle requires turning on (engaging) a startup clutch connected to a hydraulic pressure circuit of a transmission mechanism.

With a vehicle in which such "idle reduction control" is possible, when the idle reduction state is entered, a mechanical oil pump that was operating by the driving force of the engine is also stopped, and therefore the supply of hydraulic pressure from the mechanical oil pump stops. For this reason, an electrical oil pump that can be driven by an electrical motor is provided, and even when the engine is in a stopped state, oil (hydraulic oil, i.e., ATF) is supplied to a power transmission mechanism including a transmission mechanism and the like by the driving of the electrical oil pump, thus enabling ensuring hydraulic pressure for engaging the startup clutch. In particular, with an automatic transmission vehicle, the time period from when the engine start condition (brake pedal release operation) is established until when the car starts up is shorter than in the case of a manual transmission vehicle (the engine start condition being a clutch pedal press operation), and therefore it is effective to engage the startup clutch in advance by hydraulic pressure from the electrical oil pump.

Patent Literature 1 and 2 disclose that a mechanical oil pump and an electrical oil pump are provided, and when the idle reduction state is entered, the electrical oil pump is driven and hydraulic pressure is supplied to the startup clutch, thus turning on the startup clutch. Furthermore, such patent literature also discloses a configuration in which an oil passage for directly supplying hydraulic pressure from the electrical oil pump to the startup clutch is provided, thus enabling hydraulic pressure to be supplied to the startup clutch without causing the hydraulic pressure to pass through a hydraulic pressure control unit including various types of valves (a regulator valve, a modulator valve, and the like) in the hydraulic pressure circuit. This prevents occurrences of pressure loss and oil leakage in the various types of valves.

CITATION LIST

Patent Literature

PTL 1: JP 2008-69838A
PTL 2: JP 2003-39988A
PTL 3: JP H11-93721A

SUMMARY OF INVENTION

Technical Problem

However, in the patent literature, a check valve or an electromagnetic on-off valve is provided in order to, when hydraulic pressure from the electrical oil pump is directly supplied to the startup clutch, prevent oil from flowing to a hydraulic pressure passage other than the hydraulic pressure passage to the startup clutch (i.e., the hydraulic pressure passage connecting to the hydraulic pressure control unit). In other words, in the idle reduction state, due to the check valve or electromagnetic on-off valve, the flow of oil to another hydraulic pressure passage is prevented, and hydraulic pressure from the electrical oil pump is supplied to only the startup clutch.

Specifically, in Patent Literature 1, a check valve for preventing a failure in which hydraulic oil flows into a lockup control oil passage is provided, and the flow of hydraulic oil into the lockup control oil passage in the idle reduction state is prevented by the check valve.

Also, in Patent Literature 2, an electromagnetic on-off valve is disposed in the hydraulic pressure passage between the hydraulic pressure control unit and a C1 clutch that is the startup clutch, and the hydraulic pressure passage is obstructed in the idle reduction state by turning on the electromagnetic on-off valve.

In this way, a dedicated valve mechanism (the check valve or the electromagnetic on-off valve) is newly provided in conventional configurations in order to realize a configuration in which hydraulic pressure from the electrical oil pump is directly supplied to the startup clutch. Such configurations are not preferable since the number of parts configuring the hydraulic pressure circuit increases, thus leading to an increase in the complexity of the configuration and an elevation in cost.

An object of the present invention is to provide a hydraulic pressure supply control apparatus for an automobile that, in a configuration in which hydraulic pressure can be directly supplied to a certain friction engaging element at a time of execution of internal combustion engine automatic stop control (idle reduction control), enables preventing hydraulic oil from flowing into another hydraulic pressure passage, without newly adding a special valve mechanism.

Solution to Problem

—Principle of Solution to Problem—

A principle of a solution of the present invention is that, in the case in which a hydraulic pressure passage is provided for enabling hydraulic pressure to be directly supplied to a startup clutch (startup friction engaging element) at a time of idle reduction, by closing an existing valve, hydraulic oil supplied to the startup clutch is prevented from flowing to various types of valves such as a regulator valve.

—Solution Means—

Specifically, the present invention is a hydraulic pressure supply control apparatus provided in an automobile that performs internal combustion engine automatic stop control in which driving of an internal combustion engine is stopped in a case in which a predetermined internal combustion engine automatic stop condition is established, the hydraulic pressure supply control apparatus including: a friction engaging unit including a startup friction engaging element; a hydraulic pressure control unit for hydraulic pressure adjustment that is connected to the friction engaging unit via a hydraulic pressure passage; and a hydraulic pressure supply source that supplies hydraulic pressure for engaging the startup friction engaging element, and the hydraulic pressure supply control apparatus includes a shunt hydraulic pressure supply passage that directly supplies hydraulic pressure from the hydraulic pressure supply source to the friction engaging unit without causing the hydraulic pressure to pass through the hydraulic pressure control unit; and a valve mechanism closing portion (valve mechanism closing means) that, when executing the internal combustion engine automatic stop control, forcibly causes at least one of existing valve mechanisms respectively included in the friction engaging unit and the hydraulic pressure control unit to enter a closed state so as to suppress a flow of hydraulic oil from the hydraulic pressure supply source into the hydraulic pressure control unit via the friction engaging unit.

According to this specified matter, when an internal combustion engine automatic stop condition is established and the internal combustion engine automatic stop control is executed, hydraulic pressure from the hydraulic pressure supply source is directly supplied to the friction engaging unit via the shunt hydraulic pressure supply passage. In other words, hydraulic pressure for engaging the startup friction engaging element can be supplied to the friction engaging unit without being caused to pass through various types of valves (a regulator valve, a modulator valve, and the like) included in the hydraulic pressure control unit. Also, at this time, at least one of the existing valve mechanisms respectively included in the friction engaging unit and the hydraulic pressure control unit is forcibly caused to enter the closed state, thus suppressing hydraulic oil supplied to the friction engaging unit from flowing into the hydraulic pressure control unit. This enables stably and sufficiently ensuring the engaging force of the startup friction engaging element. Also, the leakage of hydraulic pressure into the hydraulic pressure control unit can be prevented by effective utilization of an existing valve mechanism, thus eliminating the need to newly provide a dedicated valve mechanism such as a check valve or electromagnetic on-off valve that are necessary in conventional technology. This consequently eliminates an increase in the number of parts configuring the hydraulic pressure control circuit, and avoids an increase in the complexity of the configuration and an elevation in cost.

The hydraulic pressure supply source may specifically be an electrical oil pump driven by an electrical motor, and be configured so as to engage the startup friction engaging element by being driven in accordance with a start of the internal combustion engine automatic stop control.

When the internal combustion engine automatic stop control is executed, a mechanical oil pump that was operating by the driving force of the internal combustion engine is also stopped, and thus the supply of hydraulic pressure from the mechanical oil pump stops. For this reason, an electrical oil pump is provided, and even while the engine is in a stopped state, hydraulic pressure can be supplied to the startup friction engaging element with use of the driving of the electrical oil pump, thus engaging the startup friction engaging element. In this case, it is sufficient for the functionality of the electrical oil pump to be able to produce hydraulic pressure for causing the startup friction engaging element to enter an engaged state. Also, since the hydraulic pressure is supplied via the shunt hydraulic pressure supply passage, almost no pressure loss exists from the electrical oil pump to the startup friction engaging element. This enables employing a small-size electrical oil pump, and enables a reduction in the size of the space where the electrical oil pump is disposed and a reduction in energy consumption.

The following are a specific configuration of the friction engaging unit and a specific configuration for supplying hydraulic pressure to the friction engaging unit.

The friction engaging unit may further include, in addition to the startup friction engaging element, a solenoid valve that switches supply and non-supply of hydraulic pressure to the startup friction engaging element, the shunt hydraulic pressure supply passage may be connected to a hydraulic pressure passage between the startup friction engaging element and the solenoid valve, and the valve mechanism closing portion may be configured so as to, when executing the internal combustion engine automatic stop control, forcibly cause the solenoid valve to enter the closed state.

In this case, a linear solenoid valve or a duty solenoid valve can be applied as the solenoid valve.

According to this configuration, the hydraulic pressure passage can be obstructed on the direct upstream side (solenoid valve side) of the startup friction engaging element, thus enabling engaging the startup friction engaging element with a predetermined engaging force in a short time period after the start of the supply of hydraulic pressure from the hydraulic pressure supply source. In other words, even if the time period from the start to the cancellation of the internal combustion engine automatic stop control is very short, a sufficient engaging force is obtained for the startup friction engaging element at the time of restart of the internal combustion engine, and rapid startup is possible.

The following are another specific configuration of the friction engaging unit and another specific configuration for supplying hydraulic pressure to the friction engaging unit.

The friction engaging unit may further include, in addition to the startup friction engaging element, a solenoid valve that switches supply and non-supply of hydraulic pressure to the startup friction engaging element, the shunt hydraulic pressure supply passage may be connected to a hydraulic pressure passage between the startup friction engaging element and an output port of the solenoid valve, and the valve mechanism closing portion may be configured so as to, when executing the internal combustion engine automatic stop control, cause the solenoid valve to enter an open state in which the output port and an input port are in communication, and also forcibly cause, from among various types of valves included in the hydraulic pressure control unit, a valve directly connected to the input port of the solenoid valve by a hydraulic pressure passage to enter the closed state.

The following are still other specific configurations.

The friction engaging unit may include, in addition to the startup friction engaging element, a solenoid valve that switches supply and non-supply of hydraulic pressure to the startup friction engaging element, the shunt hydraulic pressure supply passage may be connected to a hydraulic pressure passage between an input port of the solenoid valve and the hydraulic pressure control unit, and the valve mechanism closing portion may be configured so as to, when executing the internal combustion engine automatic stop control, cause the solenoid valve to enter an open state in which an output port and the input port are in communication, and also forcibly cause, from among various types of valves included in the hydraulic pressure control unit, a valve directly connected to the input port of the solenoid valve by a hydraulic pressure passage to enter the closed state.

According to this specified matter, hydraulic pressure supplied to the friction engaging unit can be prevented from flowing into the hydraulic pressure control unit even while causing the solenoid valve to enter the open state in which the output port and the input port are in communication. In other words, causing the solenoid valve to enter the open state in order to engage the startup friction engaging element when executing the internal combustion engine automatic stop control is the same as in conventional technology, thus eliminating the need to make design modifications from conventional technology on the configuration of and control of the solenoid valve, and since the effect described above can be achieved by only closing a valve of the hydraulic pressure control unit, it is possible to improve the usefulness of the present invention.

One example of a specific configuration in the case of these solutions means is a configuration in which the hydraulic pressure supply control apparatus is provided in an automatic transmission including a by-wire system shift switching apparatus that switches a shift range by an actuator, and the valve forcibly caused to enter the closed state is a manual shift valve in which a spool can be moved by the actuator.

Accordingly, the manual shift valve can be forcibly caused to enter the closed state (enter a state in which hydraulic pressure supplied to the friction engaging unit can be prevented from flowing into the hydraulic pressure control unit) by the actuator even if a shift range switching operation is not performed by a driver, and furthermore the usefulness of the present invention can be raised.

Advantageous Effects of Invention

According to the present invention, a hydraulic pressure passage is provided that enables hydraulic pressure to be directly supplied to the startup friction engaging element at the time of internal combustion engine automatic stop control, and it is possible to, by closing an existing valve, suppress hydraulic oil supplied to the startup friction engaging element from flowing into the hydraulic pressure control unit including various types of valves such as a regulator valve. Accordingly, the need to newly provide a dedicated valve mechanism such as a check valve or an electromagnetic on-off valve that has been necessary in conventional technology is eliminated, and an increase in the number of parts configuring the hydraulic pressure control circuit is eliminated, and thus an increase in the complexity of the configuration and an elevation in cost can be avoided.

BRIEF DESCRIPTION OF DRAWINGS

FIG. 3 is an operation table of the automatic transmission.

DESCRIPTION OF EMBODIMENTS

Below is a description of embodiments of the present invention based on the drawings. Described in the embodiments of the present invention are cases in which an electrical oil pump is applied as a hydraulic pressure supply source that supplies hydraulic pressure to a startup clutch (startup friction engaging element) at the time of idle reduction.

Embodiment 1

Figure 1:
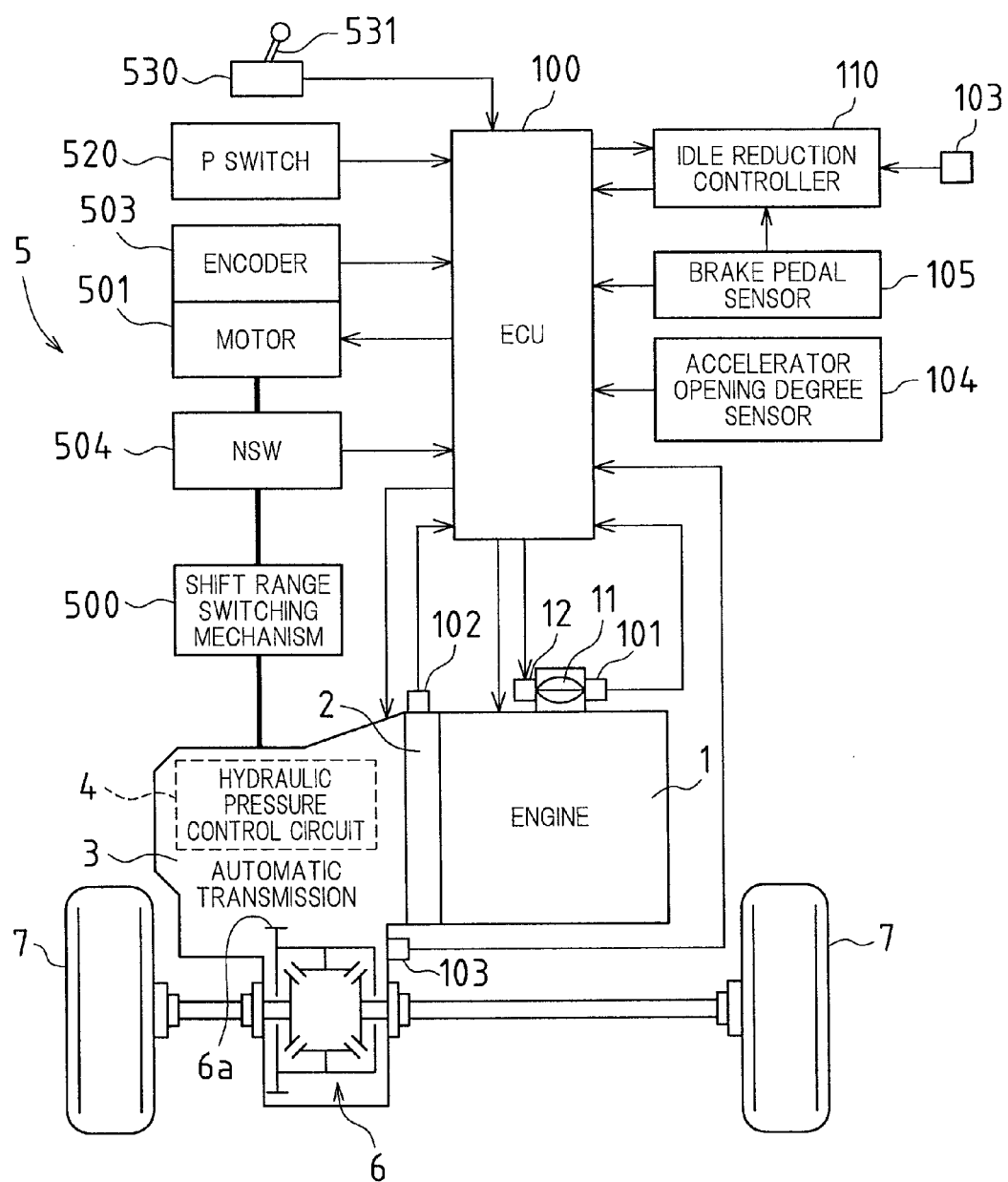
FIG. 1 is a schematic configuration diagram of a vehicle in which an automatic transmission according to an embodiment is mounted.

FIG. 1 is a schematic configuration diagram of a vehicle according to the present embodiment. The vehicle is an FF (front-engine, front-drive) type of vehicle, and mounted therein are an engine (internal combustion engine) 1 that is a running power source, a torque converter 2, an automatic transmission 3, a shift-by-wire system shift switching apparatus 5 that switches the shift range of the automatic transmission 3, a differential gear apparatus 6, an ECU 100, and the like.

A crankshaft (not shown) that is the output shaft of the engine 1 is coupled to the torque converter 2, and the output of the engine 1 is transmitted from the torque converter 2 to the differential gear apparatus 6 via the automatic transmission 3 and the like, and distributed to left and right drive wheels 7.

The following describes portions in the engine 1, the torque converter 2, the automatic transmission 3, the shift switching apparatus 5, and the ECU 100.

—Engine—

The engine 1 is, for example, a multicylinder gasoline engine. The volume of intake air drawn into the engine 1 is adjusted by an electronically-controlled type of throttle valve 11. The throttle valve 11 can electronically control the throttle opening degree independently of an accelerator pedal operation performed by a driver, and the opening degree thereof (the throttle opening degree) is detected by a throttle opening degree sensor 101.

Drive control of the throttle opening degree of the throttle valve 11 is performed by the ECU 100. Specifically, the throttle opening degree of the throttle valve 11 is controlled so as to obtain an optimum intake air volume (target air intake volume) in accordance with the driving state of the engine 1, such as the engine speed and the accelerator pedal pressed amount (accelerator opening degree). More specifically, the actual throttle opening degree of the throttle valve 11 is detected with use of the throttle opening degree sensor 101, and feedback control is performed on a throttle motor 12 of the throttle valve 11 such that the actual throttle opening degree matches the throttle opening degree (target throttle opening degree) that can achieve the target air intake volume.

—Torque Converter—

Figure 2:
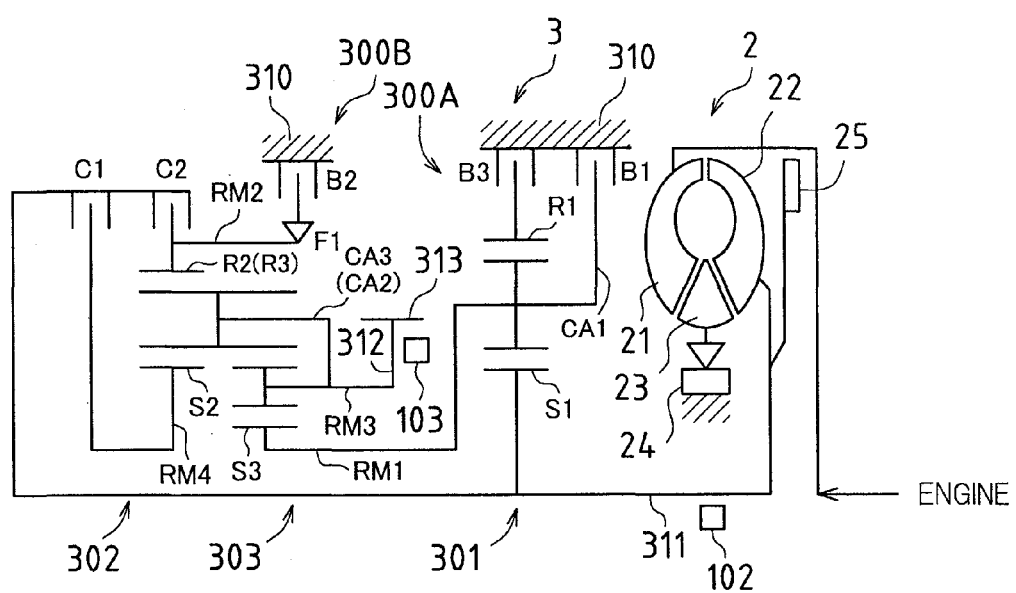
FIG. 2 is a skeleton diagram of the automatic transmission.

As shown in FIG. 2 (skeleton diagram of the automatic transmission), the torque converter 2 includes a pump impeller 21 on the input shaft side, a turbine runner 22 on the output shaft side, a stator 23 that exhibits a torque amplification function, and a one-way clutch 24, and power transmission is performed between the pump impeller 21 and the turbine runner 22 via a fluid.

A lock-up clutch 25 that causes the input side and the output side to enter a directly coupled state is provided in the torque converter 2, and completely engaging the lock-up clutch 25 causes the pump impeller 21 and the turbine runner 22 to rotate integrally. Also, engaging the lock-up clutch 25 in a predetermined slip state causes the turbine runner 22 to rotate slower than the pump impeller 21 by a predetermined slip amount during driving.

—Automatic Transmission—

As shown in FIG. 2, the automatic transmission 3 is a planetary gear type of multi-stage transmission that has, on a coaxial line, a first transmission portion 300A configured mainly by a single-pinion type of first planetary gear apparatus 301, and a second transmission portion 300B configured mainly by a single-pinion type of second planetary gear apparatus 302 and a double-pinion type of third planetary gear apparatus 303, and the automatic transmission 3 changes the speed of rotation of an input shaft 311, transmits the rotation to an output shaft 312, and outputs the rotation from an output gear 313. The output gear 313 is mated with a differential-driven gear 6a of the differential gear apparatus 6. Note that the bottom half below the center line in FIG. 2 has been omitted since the configurations of the automatic transmission 3 and the torque converter 2 are substantially symmetrical about the center line.

The first planetary gear apparatus 301 configuring the first transmission portion 300A includes three rotational elements, namely a sun gear S1, a carrier CA1, and a ring gear R1, and the sun gear S1 is coupled to the input shaft 311.

Furthermore, due to the ring gear R1 being fixed to a housing case 310 via a third brake B3, the sun gear S1 rotates at a lower speed than the input shaft 311 with the carrier CA1 acting as an intermediate output member.

Portions in the second planetary gear apparatus 302 and the third planetary gear apparatus 303 that configure the second transmission portion 300B are coupled with each other, thus configuring four rotational elements RM1 to RM4.

Specifically, the first rotational element RM1 is configured by a sun gear S3 of the third planetary gear apparatus 303, and a ring gear R2 of the second planetary gear apparatus 302 and a ring gear R3 of the third planetary gear apparatus 303 are coupled together, thus configuring the second rotational element RM2. Furthermore, a carrier CA2 of the second planetary gear apparatus 302 and a carrier CA3 of the third planetary gear apparatus 303 are coupled together, thus configuring the third rotational element RM3. Also, the fourth rotational element RM4 is configured by a sun gear S2 of the second planetary gear apparatus 302.

In the second planetary gear apparatus 302 and third planetary gear apparatus 303, the carriers CA2 and CA3 are configured by a common member, and the ring gears R2 and R3 are configured by a common member. Furthermore, a pinion gear of the second planetary gear apparatus 302 is a Ravigneaux type of planetary gear train that also acts as a second pinion gear of the third planetary gear apparatus 303.

The first rotational element RM1 (sun gear S3) is integrally coupled with the carrier CA1 of the first planetary gear apparatus 301 that is the intermediate output member, and the rotation of the first rotational element RM1 is stopped by being selectively coupled to the housing case 310 by a first brake B1. The second rotational element RM2 (ring gears R2 and R3) is selectively coupled to the input shaft 311 via a second clutch C2, and the rotation of the second rotational element RM2 is stopped by being selectively coupled to the housing case 310 via a one-way clutch F1 and a second brake B2.

The third rotational element RM3 (carriers CA2 and CA3) is integrally coupled to the output shaft 312. The fourth rotational element RM4 (sun gear S2) is selectively coupled to the input shaft 311 via a first clutch C1 (startup friction engaging element).

With the automatic transmission 3 described above, gear stages are set by causing the first clutch C1, the second clutch C2, the first brake B1, the second brake B2, the third brake B3, the one-way clutch F1, and the like to be engaged in a predetermined state or released.

FIG. 3 is an engagement table for describing clutch and brake engagement operations for establishing gear stages in the automatic transmission 3, and in this table, a circle indicates engagement and a cross indicates release.

As shown in FIG. 3, a first (1st) forward gear stage is established when the first clutch C1 of the automatic transmission 3 is engaged, and the one-way clutch F1 is engaged in 1st. Furthermore, in the engine braking (EGB) range of 1st, the second brake B2 is caused to be engaged. A second (2nd) forward gear stage is established when the first clutch C1 and the first brake B1 are engaged. A third (3rd) forward gear stage is established when the first clutch C1 and the third brake B3 are engaged.

A fourth (4th) forward gear stage is established when the first clutch C1 and the second clutch C2 are engaged. A fifth (5th) forward gear stage is established when the second clutch C2 and the third brake B3 are engaged. A sixth (6th) forward gear stage is established when the second clutch C2 and the first brake B1 are engaged. On the other hand, a reverse gear stage (R) is established when the second brake B2 and the third brake B3 are engaged.

The rotation speed (turbine rotation speed) of the input shaft 311 of the automatic transmission 3 described above is detected by an input shaft rotation speed sensor 102. Also, the rotation speed of the output shaft 312 of the automatic transmission 3 is detected by an output shaft rotation speed sensor 103. The current gear stage of the automatic transmission 3 can be judged based on a rotation speed ratio (output rotation speed/input rotation speed) obtained from output signals from the input shaft rotation speed sensor 102 and the output shaft rotation speed sensor 103.

—Hydraulic Pressure Control Circuit—

Figure 4:
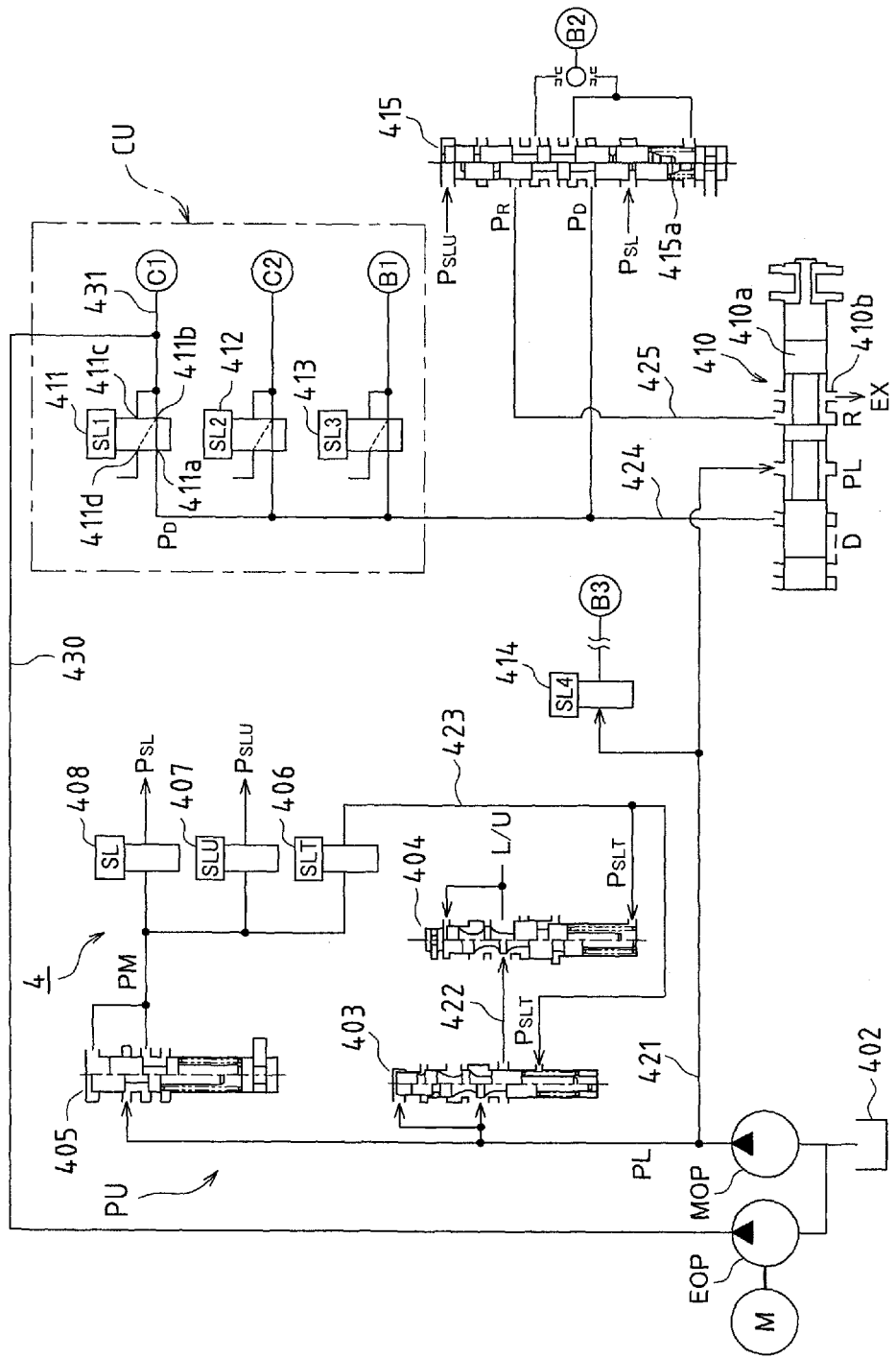
FIG. 4 is a circuit configuration diagram showing part of a hydraulic pressure control circuit in Embodiment 1.

Next is a description of part of a hydraulic pressure control circuit 4 of the automatic transmission 3 with reference to FIG. 4.

The hydraulic pressure control circuit 4 in this example includes a mechanical oil pump MOP, an electrical oil pump EOP, a primary regulator valve 403, a secondary regulator valve 404, a modulator valve 405, a manual shift valve 410, a linear solenoid (SLT) 406, a linear solenoid (SLU) 407, a solenoid (SL) 408, a linear solenoid (SL1) 411, a linear solenoid (SL2) 412, a linear solenoid (SL3) 413, a linear solenoid (SL4) 414, a B2 control valve 415, and the like.

The mechanical oil pump MOP is coupled to the crankshaft of the engine 1. The mechanical oil pump MOP is driven by the rotation of the crankshaft, thus drawing in hydraulic oil (ATF, i.e., Automatic Transmission Fluid) stored in an oil pan 402 and generating hydraulic pressure. The hydraulic pressure generated by the mechanical oil pump MOP is adjusted by the primary regulator valve 403, thus producing a line pressure PL.

The electrical oil pump EOP is a pump driven by a motor (electrical motor) M and is attached at an appropriate place such as the exterior of the housing case 310, and the electrical oil pump EOP operates upon receiving power from an electrical storage apparatus such as a battery that is not shown, thus drawing in the hydraulic oil (ATF) stored in the oil pan 402 and generating hydraulic pressure. Note that the supply passage of the hydraulic oil discharged from the electrical oil pump EOP is described later.

The primary regulator valve 403 operates with use of a throttle pressure PSLT adjusted by the linear solenoid (SLT)

406 as the pilot pressure. The line pressure PL is supplied to the manual shift valve 410 through a first line-pressure oil passage 421. Also, the line pressure PL is adjusted by the linear solenoid (SL4) 414 and supplied to a hydraulic pressure servo of the third brake B3.

The secondary regulator valve 404 operates with use of the throttle pressure PSLT adjusted by the linear solenoid (SLT) 406 as the pilot pressure. The secondary regulator valve 404 adjusts the hydraulic pressure in a second line-pressure oil passage 422 into which flows excess hydraulic oil that has flowed out of (been discharged from) the primary regulator valve 403. Secondary pressure is produced by the secondary regulator valve 404.

In the hydraulic pressure control circuit 4 of FIG. 4, if a spool valve 410a of the manual shift valve 410 is in a D position, the first line-pressure oil passage 421 and a D range pressure oil passage 424 are in communication, and hydraulic pressure is supplied to the D range pressure oil passage 424. If the spool valve 410a of the manual shift valve 410 is in an R position, the first line-pressure oil passage 421 and an R range pressure oil passage 425 are in communication, and hydraulic pressure is supplied to the R range pressure oil passage 425. If the spool valve 410a of the manual shift valve 410 is in an N position, the D range pressure oil passage 424, the R range pressure oil passage 425, and a drain port 410b are in communication, and D range pressure in the D range pressure oil passage 424 and R range pressure in the R range pressure oil passage 425 are discharged from the drain port 410b.

The hydraulic pressure supplied to the D range pressure oil passage 424 is ultimately supplied to hydraulic pressure servos of the first brake B1, the second brake B2, the first clutch C1, and the second clutch C2. The hydraulic pressure supplied to the R range pressure oil passage 425 is ultimately supplied to the hydraulic pressure servo of the second brake B2.

The modulator valve 405 adjusts the line pressure to a certain pressure. Hydraulic pressure (solenoid modulator pressure) PM that has been adjusted by the modulator valve 405 is supplied to the linear solenoid (SLT) 406, the linear solenoid (SLU) 407, and the solenoid (SL) 408.

The linear solenoid (SL1) 411 generates a first hydraulic pressure PC1 for controlling the engagement state of the first clutch C1 with use of D range pressure PD output from the manual shift valve 410 as the source pressure, and supplies the first hydraulic pressure PC1 to the hydraulic pressure servo of the first clutch C1.

The linear solenoid (SL2) 412 generates a second hydraulic pressure PC2 for controlling the engagement state of the second clutch C2 with use of the D range pressure PD as the source pressure, and supplies the second hydraulic pressure PC2 to the hydraulic pressure servo of the second clutch C2.

The linear solenoid (SL3) 413 generates a third hydraulic pressure PB1 for controlling the engagement state of the first brake B1 with use of the D range pressure PD as the source pressure, and supplies the third hydraulic pressure PB1 to the hydraulic pressure servo of the first brake B1.

The linear solenoid (SL4) 414 generates a fourth hydraulic pressure PB3 for controlling the engagement state of the third brake B3 with use of the line pressure PL as the source pressure, and supplies the fourth hydraulic pressure PB3 to the hydraulic pressure servo of the third brake B3.

The linear solenoid (SLT) 406 adjusts the solenoid modulator pressure PM in accordance with a control signal from the ECU 100 based on a throttle opening degree TAP detected by the throttle opening degree sensor 101, thus producing the throttle pressure PSLT. The throttle pressure PSLT is supplied to the primary regulator valve 403 via an SLT oil passage 423. The throttle pressure PSLT is used as the pilot pressure of the primary regulator valve 403.

The linear solenoid (SLT) 406, the linear solenoid (SLU) 407, the solenoid (SL) 408, the linear solenoid (SL1) 411, the linear solenoid (SL2) 412, the linear solenoid (SL3) 413, and the linear solenoid (SL4) 414 described above are controlled by control signals transmitted from the ECU 100.

The B2 control valve 415 is connected to the D range pressure oil passage 424 and the R range pressure oil passage 425. The B2 control valve 415 selectively supplies hydraulic pressure to the second brake B2 from either the D range pressure oil passage 424 or the R range pressure oil passage 425. The B2 control valve 415 is controlled by hydraulic pressure PSLU and PSL supplied from the linear solenoid (SLU) 407 and the solenoid (SL) 408, and by the biasing force of a spring 415a.

If the solenoid (SL) 408 is off, and the linear solenoid (SLU) 407 is on, the B2 control valve 415 is in the state on the left side in FIG. 4. In this case, hydraulic pressure generated by adjusting the D range pressure PD with use of hydraulic pressure supplied from the linear solenoid (SLU) 407 as the pilot pressure is supplied to the hydraulic pressure servo of the second brake B2. On the other hand, if the solenoid (SL) 408 is on, and the linear solenoid (SLU) 407 is off, the B2 control valve 415 is in the state on the right side in FIG. 4. In this case, the R range pressure PR is supplied to the hydraulic pressure servo of the second brake B2.

Next is a description of the supply passage of the hydraulic pressure discharged from the electrical oil pump EOP.

A friction engaging unit CU according to the present invention is configured by the hydraulic pressure servos of the first clutch C1, the second clutch C2, and the first brake B1, and the linear solenoids 411, 412, and 413 that control the hydraulic pressure supplied to these hydraulic pressure servos.

Also, as shown in FIG. 4, a hydraulic pressure passage (hereinafter, called the shunt hydraulic pressure supply passage) 430, which is connected to the discharge side of the electrical oil pump EOP, is connected to a hydraulic pressure passage 431 that connects the hydraulic pressure servo of the first clutch C1 in the friction engaging unit CU and the linear solenoid (SL1) 411 that controls the engagement state of the first clutch C1. In other words, the shunt hydraulic pressure supply passage 430 is connected to the hydraulic pressure passage 431 that connects the hydraulic pressure servo of the first clutch C1 and the linear solenoid (SL1) 411, without being connected to the primary regulator valve 403, the secondary regulator valve 404, the modulator valve 405, and the like that are described above. For this reason, the configuration is such that the hydraulic pressure from the electrical oil pump EOP can be directly supplied to the first clutch C1 via the shunt hydraulic pressure supply passage 430.

For this reason, the configuration is such that when oil pressure is supplied from the electrical oil pump EOP, such oil pressure is caused to not pass through various types of valves such as the primary regulator valve 403, thus avoiding occurrences of pressure loss and oil leakage in the various type of valves. Note that in the present embodiment, a unit configured by the various types of valves such as the primary regulator valve 403, the secondary regulator valve 404, the modulator valve 405, and the manual shift valve 410, and the hydraulic pressure passages that connect them is called a hydraulic pressure control unit PU for hydraulic pressure adjustment.

—Shift Switching Apparatus—

Figure 5:
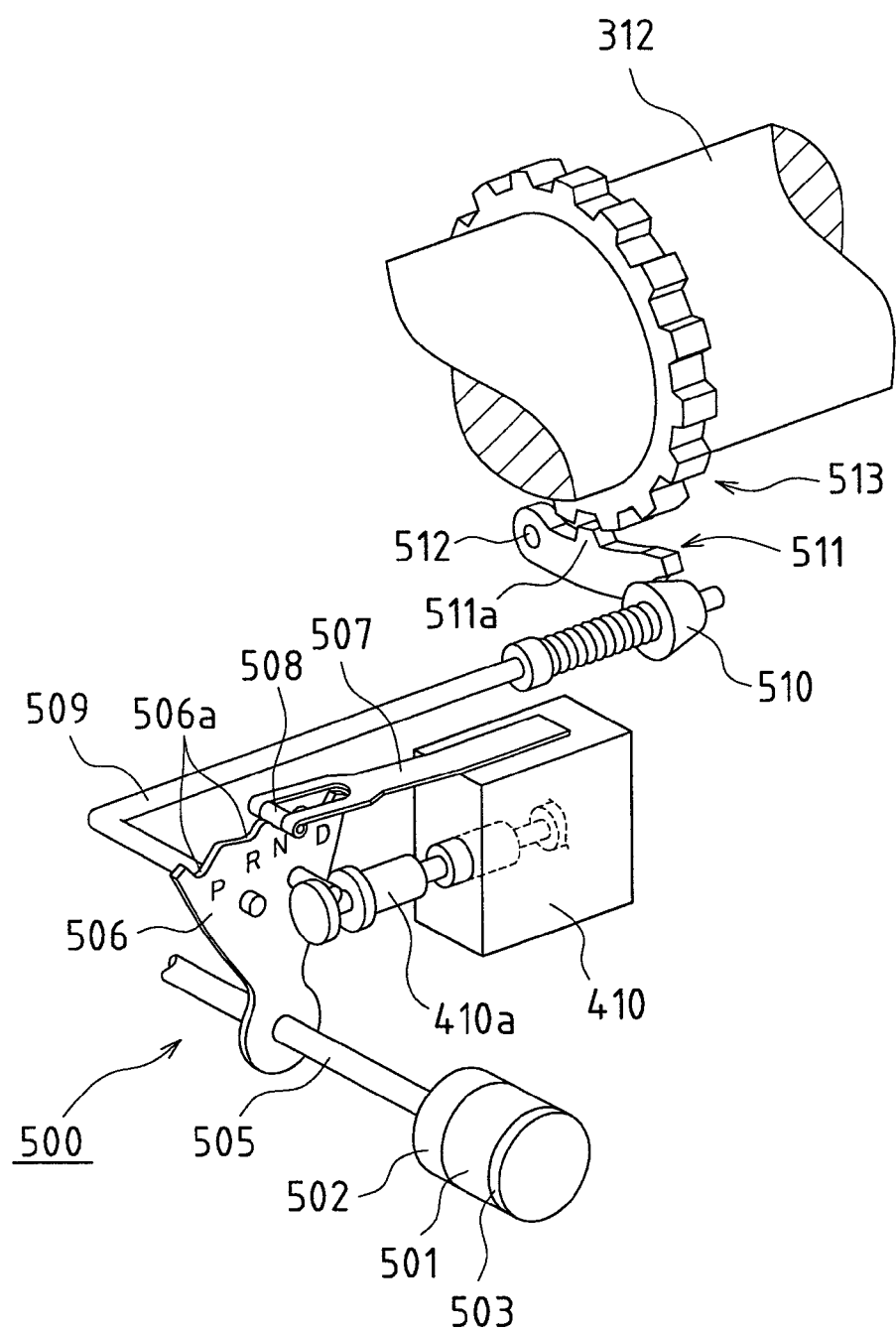
FIG. 5 is a perspective diagram showing a schematic configuration of a shift range switching mechanism.

Next is a description of the shift switching apparatus 5 with reference to FIGS. 1 and 5.

The shift switching apparatus 5 is an apparatus that switches the shift range of the automatic transmission 3, and includes a shift range switching mechanism 500, a motor 501 that drives the shift range switching mechanism 500, an encoder 503 that detects the rotation angle of a rotor of the motor 501, an NSW (neutral start switch) 504, a P switch 520, a shift switch 530, and the like. The shift switching apparatus 5 functions as a shift-by-wire apparatus that switches the shift range of the automatic transmission 3 under electronic control.

The P switch 520 is a switch for switching the shift range from a range other than parking (non-P range) to a parking range (P range), and although not shown, includes an indicator for showing the state of the switch to the user (driver), and input portion that receives an instruction from the user, and the like, and an instruction to put the shift range in the P range can be input by the user performing an operation (ON operation) on the input portion. The instruction (instruction to put the shift range in the P range) from the operation performed on the input portion of the P switch 520 is input to the ECU 100. Note that examples of the input portion of the P switch 520 include a push switch.

Figure 6:
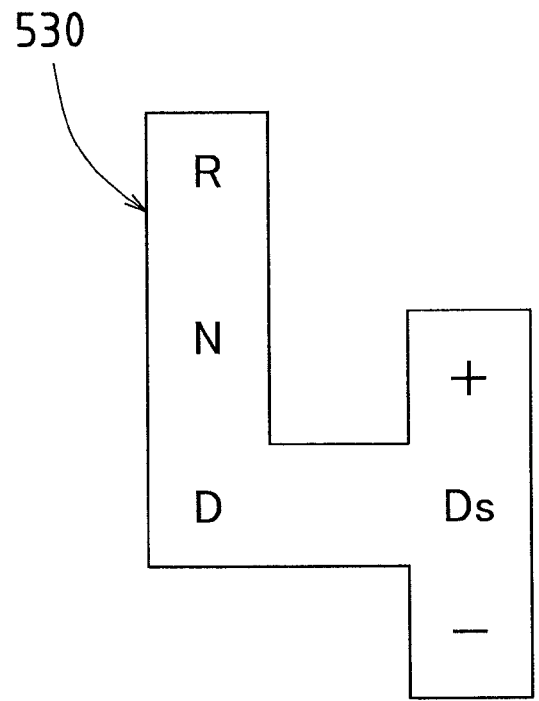
FIG. 6 is a diagram showing a shift gate of a shift switch.

The shift switch 530 is a switch that is operated by the user, and is provided with a shift lever 531 on which a move operation can be performed. Also, as shown in FIG. 6, the shift switch 530 is provided with a reverse range (R range), a neutral range (N range), a drive range (D range), and a sequential range (S range), and the user can move the shift lever 531 to a desired transmission range. When these transmission ranges, namely the R range, the N range, the D range, and a Ds range (including a "+" range and a "−" range described below) are selected (operated) by the user, requested range information thereof is input to the ECU 100.

Note that in the state in which the shift lever 531 of the shift switch 530 has been moved to the "Sequential (Ds) position", the automatic transmission 3 is put into "manual transmission mode". A "+" position and a "−" position are provided respectively in front of and behind the Ds position. The "+" position is a position to which the shift lever 531 is moved when performing a manual up-shift, and the "−" position is a position to which the shift lever 531 is moved when performing a manual down-shift. When the shift lever 531 is in the Ds position, if the shift lever 531 is moved to the "+" position or the "−" position with the Ds position being the middle position, the gear stage of the automatic transmission 3 is switched to a higher or lower gear stage.

The NSW 504 detects the rotational position of a detent plate 506 that is described later, that is to say, detects whether the manual shift valve 410 is in the P range, the R range, the N range, or the D range position. An output signal of the NSW 504 is input to the ECU 100.

Next is a description of the shift range switching mechanism 500 with reference to FIG. 5.

The shift range switching mechanism 500 is a mechanism that switches the shift range of the automatic transmission 3 to the P range, the R range, the N range, and the D range. The motor 501 that is the drive source of the shift range switching mechanism 500 is a synchronous motor such as a switched reluctance motor (SR motor), and is provided with a deceleration mechanism 502. Also, the motor 501 is provided with the encoder 503 for detecting the rotation angle of a rotor. The encoder 503 is configured by, for example, a magnetic type of rotary encoder, and outputs a pulse signal to the ECU 100 in synchronization with the rotation of the rotor of the motor 501.

An output shaft (a rotation shaft of the deceleration mechanism 502) of the motor 501 of the shift range switching mechanism 500 is coupled to a manual shaft 505. The detent plate 506 for switching the manual shift valve 410 of the hydraulic pressure control circuit 4 of the automatic transmission 3 is fixed to the manual shaft 505.

The spool valve 410a of the manual shift valve 410 is coupled to the detent plate 506, and by pivoting the detent plate 506 integrally with the manual shaft 505 with use of the motor 501, the operation amount of the manual shift valve 410 (the position of the spool valve 410a) is switched, thus switching the range of the automatic transmission 3 to the P range, the R range, the N range, or the D range.

Four recessed portions 506a for holding the spool valve 410a of the manual shift valve 410 at positions corresponding to the P range, the R range, the N range, and the D range are formed in the detent plate 506.

A detent spring (plate spring) 507 is disposed above the detent plate 506. The detent spring 507 is fixed to the manual shift valve 410 in a cantilever supported manner. A roller 508 is attached to a tip portion of the detent spring 507. The roller 508 is pressed against the detent plate 506 by the elastic force of the detent spring 507. Then, due to the roller 508 fitting into the recessed portion 506a of a target range of the detent plate 506, the detent plate 506 is held at the rotation angle of the target range, and the position of the spool valve 410a of the manual shift valve 410 is held at a target range position.

Meanwhile, a parking rod 509 is fixed to the detent plate 506. A conical tapered cam 510 is provided at a tip portion of the parking rod 509, and a lock lever 511 abuts the outer circumferential face (cam face) of the cam 510. The lock lever 511 is configured such that the lock lever 511 moves vertically around a rotation shaft 512 according to the position of the cam 510, and due to the vertical movement, a lock claw 511a of the lock lever 511 engages with a parking gear 513 or disengages from the parking gear 513, thus locking/freeing the rotation of the parking gear 513. Also, the parking gear 513 is provided on the output shaft 312 of the automatic transmission 3, and if the parking gear 513 is locked by the lock lever 511, the drive wheels 7 (see FIG. 1) of the vehicle are held in a detent state (parking state).

In the shift range switching mechanism 500 described above, in the case of the P range, the parking rod 509 moves in a direction approaching the lock lever 511, a large-diameter portion of the cam 510 pushes the lock lever 511 upward, the lock claw 511a of the lock lever 511 fits into the parking gear 513, and thus the parking gear 513 enters a locked state, and accordingly, the output shaft (drive wheels) 312 of the automatic transmission 3 are held in the locked state (parking state).

On the other hand, in the case of a shift range other than the P range, the parking rod 509 moves in a direction of separation from the lock lever 511, and in accordance with this movement, the portion of the lock lever 511 that is in contact with the cam 510 moves from the large-diameter portion to a small-diameter portion, and thus the lock lever 511 descends. Accordingly, the lock claw 511a of the lock lever 511 disengages from the parking gear 513 and the parking gear 513 is freed, and thus the output shaft 312 of the automatic transmission 3 is held in a rotatable state (running-possible state).

—ECU—

The ECU 100 includes a CPU, a ROM, a RAM, a backup RAM, an input/output interface, and the like.

As shown in FIG. 1, the ECU 100 is connected to the throttle opening degree sensor 101, the input shaft rotation speed sensor 102, the output shaft rotation speed sensor 103, the accelerator opening degree sensor 104, the brake pedal sensor 105, and the like, and output signals from these sensors, that is to say, signals indicating the throttle opening degree TAP of the throttle valve 11, an input shaft rotation speed Nin and an output shaft rotation speed Nout of the automatic transmission 3, an accelerator pedal operation amount (accelerator opening degree), the presence/absence of a foot brake operation (brake on/off), and the like are supplied to the ECU 100. Also, the ECU 100 is connected to the encoder 503, the P switch 520, and the shift switch 530 of the shift switching apparatus 5. Furthermore, the ECU 100 is connected to the throttle motor 12 and the hydraulic pressure control circuit 4 of the engine 1, the motor 501 of the shift switching apparatus 5, and the like.

The ECU 100 sets the target rotation angle (target value for an encoder count value) corresponding to the shift range selected by the shift lever 531 of the shift switch 530 and starts energization of the motor 501, and performs feedback control (FB control) on the motor 501 such that the motor 501 stops at a position at which the detected rotation angle (encoder count value) thereof matches the target rotation angle.

Also, the ECU 100 reads the output signal of the NSW 504, judges, based on the output signal, the current rotation position of the detent plate 506 (operation amount of the manual shift valve 410), that is to say, whether the current range is the P range, the R range, the N range, or the D (Ds) range, and determines whether shift range switching has been performed normally by comparing the judgment result and the shift range (target range) selected by the shift operation.

The ECU 100 outputs a solenoid control signal to the hydraulic pressure control circuit 4. The linear solenoids and the like of the hydraulic pressure control circuit 4 are controlled based on the solenoid control signal, and in order to establish a predetermined transmission gear stage (the 1st to 6th or reverse gear stage), the first clutch C1, the second clutch C2, the first brake B1, the second brake B2, the third brake B3, the one-way clutch F1, and the like of the automatic transmission 3 are engaged in a predetermined state or released. Furthermore, the ECU 100 executes "transmission control" that is described below.

—Transmission Control—

Figure 7:
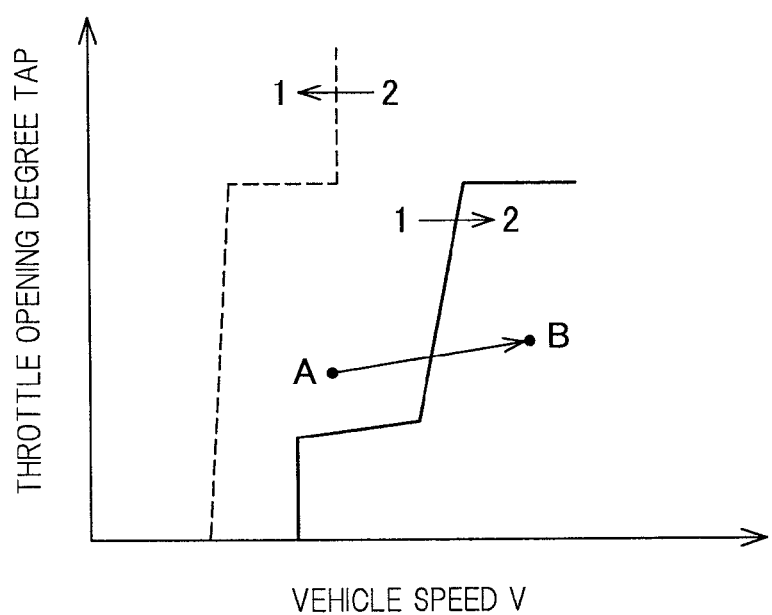
FIG. 7 is a diagram showing an example of a transmission map.

The following describes a transmission map used in transmission control in the present embodiment with reference to FIG. 7.

The transmission map shown in FIG. 7 is a map in which, using a vehicle speed V and the throttle opening degree TAP as parameters, a plurality of regions are set for obtaining an appropriate gear stage in accordance with the vehicle speed V and the throttle opening degree TAP, and the transmission map is stored in the ROM of the ECU 100. The regions in the transmission map are demarcated by a plurality of transmission lines (gear stage switching lines).

Note that in the transmission map shown in FIG. 7, shift-up lines (transmission lines) are indicated by solid lines, and shift-down lines (transmission lines) are indicated by broken lines. Also, only transmission lines for "1st to 2nd" and "2nd to 1st" are shown in the transmission map of FIG. 7.

Next is a description of basic operations of transmission control.

The ECU 100 calculates the vehicle speed V from the output signal of the output shaft rotation speed sensor 103, as well as calculates the throttle opening degree TAP from the output signal of the throttle opening degree sensor 101, and based on the vehicle speed V and the throttle opening degree TAP, calculates a target gear stage with reference to the transmission map in FIG. 7. Furthermore, the ECU 100 obtains a rotation speed ratio (output rotation speed/input rotation speed) calculated from the output signals of the input shaft rotation speed sensor 102 and the output shaft rotation speed sensor 103, judges the current gear stage, and judges whether a transmission operation is necessary by comparing the current gear stage and the target gear stage.

If, according to the judgment result, gear-changing is not necessary (if the current gear stage and the target gear stage are the same, and thus the gear stage is appropriately set), the ECU 100 outputs a solenoid control signal (hydraulic pressure command signal) indicating the maintenance of the current gear stage, to the hydraulic pressure control circuit 4 of the automatic transmission 3.

On the other hand, transmission control is performed if the current gear stage and the target gear stage are different. For example, if the vehicle is running while the gear stage of the automatic transmission 3 is in "1st", and then the running state of the vehicle changes from that situation (e.g., changes from point A to point B in FIG. 7), such a change involves crossing a shift-up transmission line (1 to 2), and therefore the target gear stage calculated from the transmission map is "2nd", a solenoid control signal (hydraulic pressure command signal) for setting the 2nd gear stage is output to the hydraulic pressure control circuit 4 of the automatic transmission 3, and a gear change from the 1st gear stage to the 2nd gear stage (a 1 to 2 up gear change) is performed.

—Idle Reduction Control—

With the vehicle according to the present embodiment, so-called idle reduction control (internal combustion engine automatic stop control) is performed in which, when the vehicle temporarily stops, such as in the example of waiting for a traffic light at an intersection, the engine 1 is stopped by stopping the ignition operation of spark plugs included in the cylinders of the engine 1 (ignition cut), as well as stopping the supply of fuel from the injectors (fuel cut). The following describes such idle reduction control.

As shown in FIG. 1, the ECU 100 that controls the driving state of the engine 1 is connected to an idle reduction controller 110 for performing idle reduction control. The idle reduction controller 110 transmits an ignition cut signal and a fuel cut signal to the ECU 100 when an idle reduction condition (internal combustion engine automatic stop condition) is established. On the other hand, when an engine start condition (idle reduction cancel condition) is established, the idle reduction controller 110 transmits an ignition cut cancel signal and a fuel cut cancel signal to the ECU 100, and at the same time transmits a start control signal to a starter that is not shown.

Also, the idle reduction controller 110 receives an input of an output signal (signal for calculating the vehicle speed) from the output shaft rotation speed sensor 103, and a brake pedal press signal and a brake pedal release signal from the brake pedal sensor 105.

Also, the idle reduction controller 110 receives, from the ECU 100, an engine rotation speed signal NE detected by a crank angle sensor that is not shown.

An idle reduction condition of the automobile according to the present embodiment is established if in an ignition ON state, for example the vehicle speed obtained from the output signal from the output shaft rotation speed sensor 103 has been detected to be "0", and furthermore execution of the brake pedal pressing operation has been detected from the brake pedal press signal from the brake pedal sensor 105. Due to this idle reduction condition being established, the idle reduction controller 110 transmits the ignition cut signal and the fuel cut signal to the ECU 100. Then, in accordance with the transmission of the ignition cut signal and the fuel cut signal, the ECU 100 stops the engine 1 by performing control for stopping the ignition operation of the spark plugs, as well as performing control for stopping the fuel injection operation of the injectors.

In the case in which the engine 1 has stopped in this way, the mechanical oil pump MOP that was operating with use of the drive power of the engine 1 is also stopped, and thus the supply of hydraulic pressure from the mechanical oil pump MOP stops. For this reason, the electrical oil pump EOP is driven, thus causing hydraulic pressure from the electrical oil pump EOP to directly act on the friction engaging unit (the hydraulic pressure passage 431 that connects the first clutch C1 and the linear solenoid (SL1) 411) via the shunt hydraulic pressure supply passage 430. Accordingly, hydraulic pressure from the electrical oil pump EOP is supplied to the hydraulic pressure servo of the first clutch C1, thus causing the first clutch C1 that is the startup clutch to wait in an engaged state. Details of the state in which hydraulic pressure is supplied to the first clutch C1 are described later.

On the other hand, an engine start condition for starting the engine 1 from the state in which the engine 1 is stopped according to the idle reduction control is established if, after the idle reduction condition has been established, execution of the brake pedal release operation has been detected from the brake pedal release signal from the brake pedal sensor 105. Due to this engine start condition being established, the idle reduction controller 110 transmits an ignition cut cancel signal and a fuel cut cancel signal to the ECU 100, and at the same time transmits the start control signal to the starter. Upon receiving the ignition cut cancel signal and the fuel cut cancel signal, the ECU 100 performs control for starting the ignition operation of the spark plugs and for starting the fuel injection operation of the injectors. Also, a starter motor of the starter operates in accordance with the start control signal, and thus cranking of the engine 1 is performed.

As described above, in the idle reduction state, the electrical oil pump EOP is driven, and hydraulic pressure from the electrical oil pump EOP causes the first clutch C1 to enter the engaged state. For this reason, the startup performance after engine starting is favorable. Also, in the case in which the engine 1 has been restarted as described above, although the supply of hydraulic pressure from the mechanical oil pump MOP is also resumed, the driving of the electrical oil pump EOP is continued until the hydraulic pressure discharged from the mechanical oil pump MOP reaches a predetermined value, thus preventing the engaging force of the first clutch C1 from decreasing. Then, when the hydraulic pressure discharged from the mechanical oil pump MOP reaches the predetermined value after a predetermined time has elapsed after the engine 1 has been restarted, the supply of hydraulic pressure from the mechanical oil pump MOP is stopped by stopping the motor M.

—Control of Linear Solenoid (SL1) 411—

A feature of the present embodiment is the control of the linear solenoid (SL1) 411 in the idle reduction state described above.

Before a description of the control of the linear solenoid (SL1) 411 is given, the following describes basic switching operations of the linear solenoid (SL1) 411.

The linear solenoid (SL1) 411 is configured by a normally-closed type of linear solenoid valve. Also, as is widely known, stored inside the linear solenoid (SL1) 411 are an electromagnetic coil, a spool capable of moving in the axial direction according to the energization state of the electromagnetic coil, and a spring that applies biasing force on the spool toward one side in the axial direction. Also, the linear solenoid (SL1) 411 includes an input port 411*a*, an output port 411*b*, a feedback port 411*c*, and a drain port 411*d*.

When the electromagnetic coil is in a non-energized state, the spool has moved to one end side in the axial direction due to the biasing force of the spring, the output port 411*b* and the drain port 411*d* are in communication (see the switching state shown by a broken line in FIG. 4), and the input port 411*a* and the output port 411*b* are obstructed. Accordingly, the hydraulic pressure from the output port 411*b* is "0", and the first clutch C1 is in the released state.

On the other hand, due to energizing the electromagnetic coil, the spool moves toward the other end side in the axial direction against the biasing force of the spring, the output port 411*b* and the drain port 411*d* are obstructed, and the input port 411*a* and the output port 411*b* are caused to be in communication (see the switching state shown by a solid line in FIG. 4). Accordingly, in the state in which hydraulic pressure is acting in the D range pressure oil passage 424 (the case in which the mechanical oil pump MOP is driven, and furthermore the spool valve 410*a* of the manual shift valve 410 is in the D position), hydraulic pressure from the output port 411*b* acts on the hydraulic pressure servo of the first clutch C1, and thus the first clutch C1 enters the engaged state. Also, since the position of the spool in the axial direction is variable according to the value of the current supplied to the electromagnetic coil, the communication surface area between the input port 411*a* and the output port 411*b* is variable, and it is possible to adjust the hydraulic pressure that acts on the first clutch C1. In other words, it is possible to adjust the engaging force of the first clutch C1. Also, a portion of the hydraulic pressure that acts on the hydraulic pressure servo of the first clutch C1 also acts on the spool via the feedback port 411*c*.

Also, with the linear solenoid (SL1) 411 in the present embodiment, in addition to the two switching states described above (the switching state in which the output port 411*b* and the drain port 411*d* are in communication, and the switching state in which the input port 411*a* and the output port 411*b* are in communication), it is possible to achieve a forced closure state in which the output port 411*b* and the feedback port 411*c* are not in communication with either of the input port 411*a* and the drain port 411*d*.

For example, in the case in which the value of the current supplied to the electromagnetic coil is set to a maximum value, thus causing the spool to move to the end side that is on the opposite side in the acting direction of the biasing force of the spring, the forced closure state is achieved in which the output port 411*b* and the feedback port 411*c* are obstructed from the input port 411*a* and the drain port 411*d*. Also, a configuration is possible in which a spool position achieving the forced closure state in which the output port 411*b* and the feedback port 411*c* are obstructed from the input port 411*a* and the drain port 411*d* exists between the above-described one end side position of the spool at which the output port 411*b* and the drain port 411*d* are in communication and the position of the spool at which the input port 411*a* and the output port 411*b* are in communication.

More specifically, the opening/closing of the ports 411*a*, 411*b*, 411*c*, and 411*d* can be switched according to the position of lands (large-diameter portions for closing ports) formed on the spool. Accordingly, it is possible to provide lands on the spool such that the output port 411*b* and the feedback port 411*c* are not in communication with either of the input port 411*a* and the drain port 411*d*, and to achieve the forced closure state by adjusting the value of the current supplied to the electromagnetic coil such that the lands become located at positions opposing the output port 411*b* and the feedback port 411*c*. In this case, the input port 411*a* and the drain port 411*d* are not in communication (i.e., are obstructed) with respect to each other.

In this kind of forced closure state, since the output port 411*b* and the feedback port 411*c* are not in communication with either of the input port 411*a* and the drain port 411*d*, the linear solenoid (SL1) 411, the hydraulic pressure servo of the first clutch C1, and the hydraulic pressure passage 431 connecting them are configured as spaces that are in communication with only the shunt hydraulic pressure supply passage 430 extending from the electrical oil pump EOP.

Note that the other linear solenoids 412 and 413 included in the friction engaging unit CU are configured so to be capable of switching between only the same two switching states as in conventional technology (the switching state in which the output port and the drain port are in communication (see the switching state shown by the broken line in FIG. 4), and the switching state in which the input port and the output port are in communication (see the switching state shown by the solid line in FIG. 4)).

An operation that is a feature of the present embodiment is an operation in which, when the idle reduction state described above is entered, the linear solenoid (SL1) 411 enters the forced closure state, thus causing the output port 411b and the feedback port 411c to not be in communication with either of the input port 411a and the drain port 411d (operation for forced closure of a valve mechanism by a valve mechanism closing portion).

Specifically, in accordance with an idle reduction signal output from the idle reduction controller 110, the forced closure state is achieved by the electrical oil pump EOP being driven and adjusting the value of the current supplied to the electromagnetic coil of the linear solenoid (SL1) 411. Accordingly, the hydraulic oil discharged from the electrical oil pump EOP directly acts on the hydraulic pressure servo of the first clutch C1 via the shunt hydraulic pressure supply passage 430, thus engaging the first clutch C1. In other words, the first clutch C1 is engaged in preparation for cancellation of the idle reduction state and startup of the vehicle.

At this time, as described above, the output port 411b and the feedback port 411c are not in communication with either of the input port 411a and the drain port 411d, and the linear solenoid (SL1) 411, the hydraulic pressure servo of the first clutch C1, and the hydraulic pressure passage 431 connecting them are configured as spaces that are in communication with only the shunt hydraulic pressure supply passage 430 extending from the electrical oil pump EOP. For this reason, oil is prevented from flowing into a hydraulic pressure passage other than the hydraulic pressure passage to the hydraulic pressure servo of the first clutch C1 (i.e., into the hydraulic pressure passage and the valve configuring the hydraulic pressure control unit PU), and it is possible to stably and sufficiently ensure the engaging force of the first clutch C1.

As more specific control performed in the case of causing the linear solenoid (SL1) 411 to enter the forced closure state in this way, from the point in time when the idle reduction state has been entered, the value of the current supplied to the electromagnetic coil is adjusted, and the spool is gradually moved toward a spool movement position at which the forced closure state is entered. During the movement of the spool, one portion of the oil from the electrical oil pump EOP that is being supplied from the shunt hydraulic pressure supply passage 430 flows to the hydraulic pressure servo of the first clutch C1, and the other portion of this oil flows to the input port 411a or the drain port 411d. Then, as the spool approaches the movement position at which the forced closure state is entered, the amount of oil flowing to the input port 411a or the drain port 411d decreases, and conversely the amount of oil flowing to the hydraulic pressure servo of the first clutch C1 increases. When the spool reaches the movement position at which the forced closure state is entered, the amount of oil flowing to the input port 411a or the drain port 411d is "0", and all of the oil flows to the hydraulic pressure servo of the first clutch C1. According to this kind of operation, the engaging force of the first clutch C1 gradually increases from the point in time when the idle reduction state has been entered, thus enabling avoiding occurrences of shock (vibration) due to sudden engagement of the first clutch C1.

Note that as another means of avoiding occurrences of shock due to sudden engagement of the first clutch C1, it is possible to gradually increase the amount of oil discharged from the electrical oil pump EOP. In other words, from the point in time when the idle reduction state has been entered, the operation for discharging oil from the electrical oil pump EOP is started by starting the motor M, and the rotation speed of the motor M is gradually increased from such time. Accordingly, the hydraulic pressure supplied to the hydraulic pressure servo of the first clutch C1 also gradually increases, and the engaging force of the first clutch C1 gradually increases, thus avoiding occurrences of shock due to sudden engagement of the first clutch C1. In this case, the need for the above-described adjustment of the value of the current supplied to the electromagnetic coil (adjustment for gradually moving the spool) is eliminated.

As described above, with the present embodiment, it is possible to prevent oil from flowing into a hydraulic pressure passage other than the hydraulic pressure passage to the hydraulic pressure servo of the first clutch C1 in the idle reduction state by causing the linear solenoid (SL1) 411, which is an existing valve (existing valve mechanism), to enter the forced closure state. Accordingly, the need to newly provide a dedicated valve mechanism such as a check valve or an electromagnetic on-off valve that has been necessary in conventional technology is eliminated, and there is no increase in the number of parts configuring the hydraulic pressure control circuit 4, thus avoiding an increase in the complexity of the configuration and an elevation in cost.

Embodiment 2

Next is a description of Embodiment 2. The present embodiment is a case in which a duty solenoid has been applied in place of the linear solenoid (SL1) 411. Other configurations and control are similar to those of Embodiment 1 described above, and therefore the following describes only differences from Embodiment 1.

Figure 8:
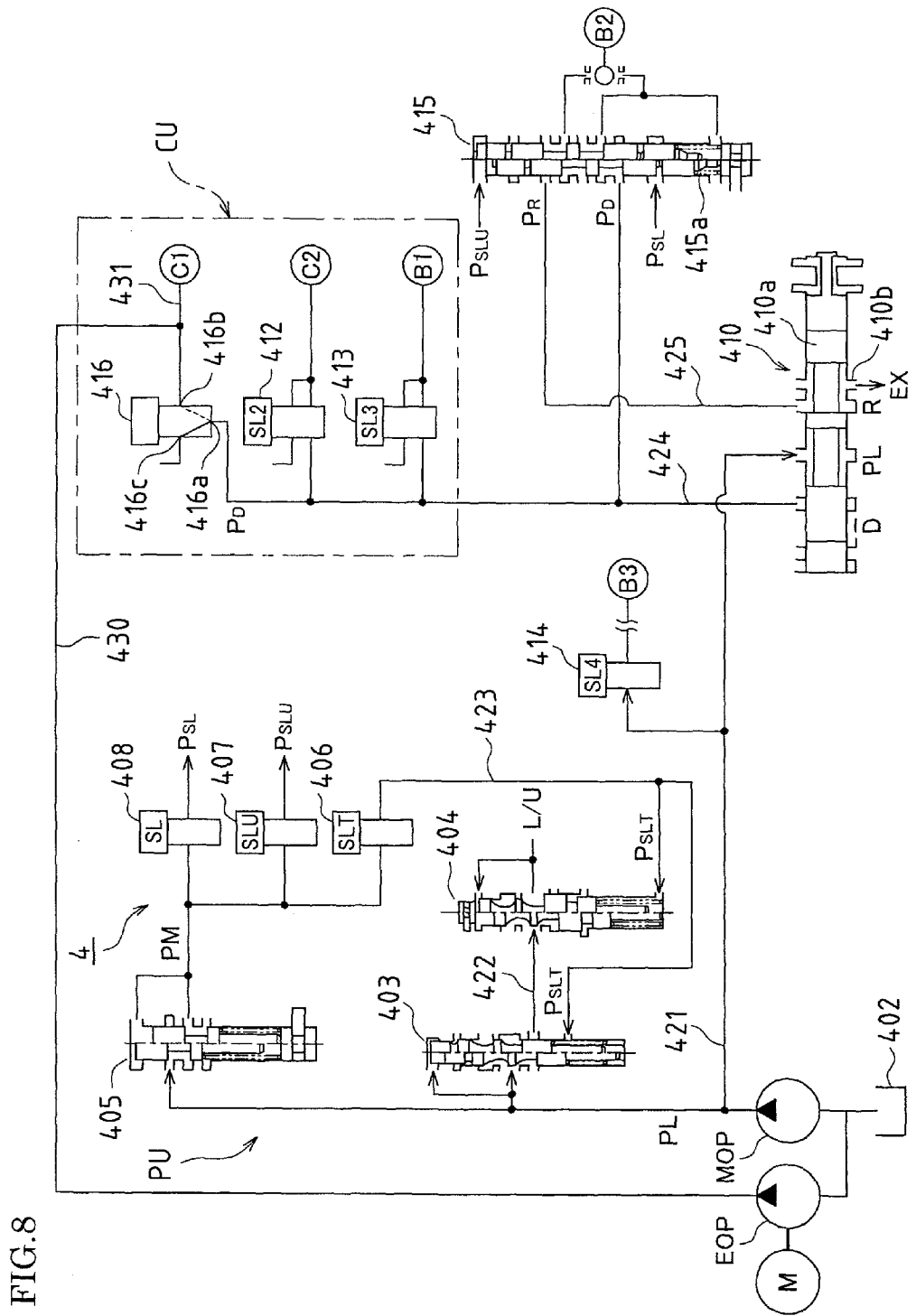
FIG. 8 is a circuit configuration diagram showing part of a hydraulic pressure control circuit in Embodiment 2.

FIG. 8 is a circuit configuration diagram showing part of a hydraulic pressure control circuit in the present embodiment.

As shown in FIG. 8, the configuration is such that a first hydraulic pressure PC1 for controlling the engagement state of the first clutch C1 is adjusted by a duty solenoid 416.

The duty solenoid 416 is configured by a three-way solenoid valve. Specifically, the duty solenoid 416 includes an input port 416a, an output port 416b, and a drain port 416c, and is capable of switching between a state in which the input port 416a and the output port 416b are in communication, and furthermore the drain port 416c is closed (the switching state shown by a broken line in FIG. 8), and a state in which the input port 416a and the drain port 416c are in communication, and furthermore the output port 416b is closed (the switching state shown by a solid line in FIG. 8, that is to say, the forced closure state). This switching is performed by turning on/off a current supply to an electromagnetic coil included in the duty solenoid 416. For example, turning on the current supply causes the state in which the input port 416a and the output port 416b are in communication, and furthermore the drain port 416c is closed to be entered, and turning off the supply current causes the state in which the input port 416a and the drain port 416c are in communication, and furthermore the output port 416b is closed to be entered. In other words, the duty solenoid 416 is a normally-closed type of solenoid. The switching of the communication state between the ports by turning on/off the supply current may be the opposite of the above description. In other words, the duty solenoid 416 may be a normally-open type of solenoid.

Note that the other valves 412 and 413 included in the friction engaging unit CU may be linear solenoids that are the same as those in Embodiment 1, or may be duty solenoids that are the same as the duty solenoid 416.

When the idle reduction control is started, the duty solenoid 416 enters the forced closure state in which the input port 416a and the drain port 416c are in communication, and furthermore the output port 416b is closed, and the output port 416b enters a state of not being in communication with either of the input port 416a and the drain port 416c.

Specifically, in accordance with an idle reduction signal output from the idle reduction controller 110, the forced closure state is entered by the electrical oil pump EOP being driven and also turning off the supply current to the electromagnetic coil of the duty solenoid 416. Accordingly, the hydraulic oil discharged from the electrical oil pump EOP directly acts on the hydraulic pressure servo of the first clutch C1 via the shunt hydraulic pressure supply passage 430, thus engaging the first clutch C1. In other words, the first clutch C1 is engaged in preparation for cancellation of the idle reduction state and startup of the vehicle.

At this time, as described above, the output port 416b is not in communication with either of the input port 416a and the drain port 416c, and the duty solenoid 416, the hydraulic pressure servo of the first clutch C1, and the hydraulic pressure passage 431 connecting them are configured as spaces that are in communication with only the shunt hydraulic pressure supply passage 430 extending from the electrical oil pump EOP. For this reason, oil is prevented from flowing into a hydraulic pressure passage other than the hydraulic pressure passage to the hydraulic pressure servo of the first clutch C1 (i.e., into the hydraulic pressure passage and the valve configuring the hydraulic pressure control unit PU), and it is possible to stably and sufficiently ensure the engaging force of the first clutch C1.

As more specific control performed in the case of causing the duty solenoid 416 to enter the forced closure state, from the point in time when the idle reduction state has been entered, the spool movement position is adjusted by performing duty control on the value of the supply current to the electromagnetic coil, thus progressively increasing the amount of oil flowing to the hydraulic pressure servo of the first clutch C1. According to this operation, the engaging force of the first clutch C1 gradually increases from the point in time when the idle reduction state has been entered, thus enabling avoiding occurrences of shock (vibration) due to sudden engagement of the first clutch C1.

Note that in the present embodiment as well, as another means of avoiding occurrences of shock due to sudden engagement of the first clutch C1, it is possible to gradually increase the amount of oil discharged from the electrical oil pump EOP.

As described above, similarly to the case of Embodiment 1 described above, the present embodiment also enables preventing oil from flowing into a hydraulic pressure passage other than the hydraulic pressure passage to the hydraulic pressure servo of the first clutch C1 in the idle reduction state by causing the duty solenoid 416, which is an existing valve, to enter the forced closure state. Accordingly, the need to newly provide a dedicated valve mechanism such as a check valve or an electromagnetic on-off valve that has been necessary in conventional technology is eliminated, and there is no increase in the number of parts configuring the hydraulic pressure control circuit 4, thus avoiding an increase in the complexity of the configuration and an elevation in cost.

Embodiment 3

Next is a description of Embodiment 3. In the present embodiment, the manual shift valve 410 is used in order to prevent hydraulic oil supplied from the electrical oil pump EOP via the shunt hydraulic pressure supply passage 430 in the idle reduction state from flowing into the hydraulic pressure control unit PU. Other configurations and control are similar to those of Embodiment 1 described above, and therefore the following describes only differences from Embodiment 1.

The hydraulic pressure control circuit 4 of the automatic transmission 3 in the present embodiment is substantially the same as the one in Embodiment 1 described above (the one shown in FIG. 4).

In the present embodiment, when the idle reduction state described above has been entered, the spool valve 410a of the manual shift valve 410 is forcibly switched to the R range position. Accordingly, a D port connecting to the D range pressure oil passage 424 is closed, and the D range pressure oil passage 424 is thereby obstructed from the first line-pressure oil passage 421, the R range pressure oil passage 425, and the drain port 410b.

Specifically, in accordance with the idle reduction signal output from the idle reduction controller 110, the electrical oil pump EOP is driven, the motor 501 of the shift range switching mechanism 500 is also driven, and the detent plate 506 is forcibly pivoted to the R range position. Accordingly, the spool valve 410a of the manual shift valve 410 moves to the R range position, and the D port connecting to the D range pressure oil passage 424 is closed, and therefore the forced closure state is entered. As described above, since a shift-by-wire apparatus for switching the shift range of the automatic transmission 3 under electronic control is employed as the shift switching apparatus 5 according to the present embodiment, even if the shift lever 531 is not operated by the driver, that is to say, even if the shift lever 531 is in the D range position, the spool valve 410a of the manual shift valve 410 can be forcibly moved to the R range position, and the forced closure state in which the D port is closed can be entered by performing a switching operation of the manual shift valve 410 at substantially the same time as the vehicle is stopped.

Also, in this case, the switching state of the linear solenoid (SL1) 411 is the state in which the input port 411a and the output port 411b are in communication. On the other hand, the switching states of the linear solenoid (SL2) 412 and the linear solenoid (SL3) 413 are states in which the output ports and the drain ports thereof are in communication. In other words, the input ports are obstructed in the linear solenoid (SL2) 412 and the linear solenoid (SL3) 413.

Accordingly, the hydraulic oil discharged from the electrical oil pump EOP directly acts on the hydraulic pressure servo of the first clutch C1 via the shunt hydraulic pressure supply passage 430, thus engaging the first clutch C1. In other words, the first clutch C1 is engaged in preparation for cancellation of the idle reduction state and startup of the vehicle. In this case, although the hydraulic oil discharged from the electrical oil pump EOP flows to the D range pressure oil passage 424 via the friction engaging unit CU, the spool valve 410a of the manual shift valve 410 is in the R range position as described above, and the manual shift valve 410 is in the forced closure state in which the D port connecting to the D range pressure oil passage 424 is obstructed. For this reason, oil is prevented from flowing into the hydraulic pressure control unit PU, and it is possible to stably and sufficiently ensure the engaging force of the first clutch C1.

Also, in the present embodiment, the linear solenoid (SL1) 411 is not a solenoid that is caused to enter the forced closure state (not the solenoid in Embodiment 1), and therefore the switching operation of the linear solenoid (SL1) 411 can be a conventional structure in which switching can be performed between a state in which the output port 411b and the drain port 411d are in communication, and the input port 411a and the output port 411b are obstructed, and a state in which the output port 411b and the drain port 411d are obstructed, and the input port 411a and the output port 411b are in communication. In other words, there is no need for a configuration in which it is possible to achieve the forced closure state in which the output port 411b and the feedback port 411c are not in communication with either of the input port 411a and the drain port 411d. For this reason, the present embodiment eliminates the need to make design modifications for any of the valves, and enables achieving the effect described above through only control of the manual shift valve 410.

Embodiment 4

Next is a description of Embodiment 4. In the present embodiment as well, the manual shift valve 410 is used in order to prevent hydraulic oil supplied from the electrical oil pump EOP via the shunt hydraulic pressure supply passage 430 in the idle reduction state from flowing into the hydraulic pressure control unit PU. Other configurations and control are similar to those of Embodiment 1 and Embodiment 3 described above, and therefore the following describes only differences from these embodiments.

Figure 9:
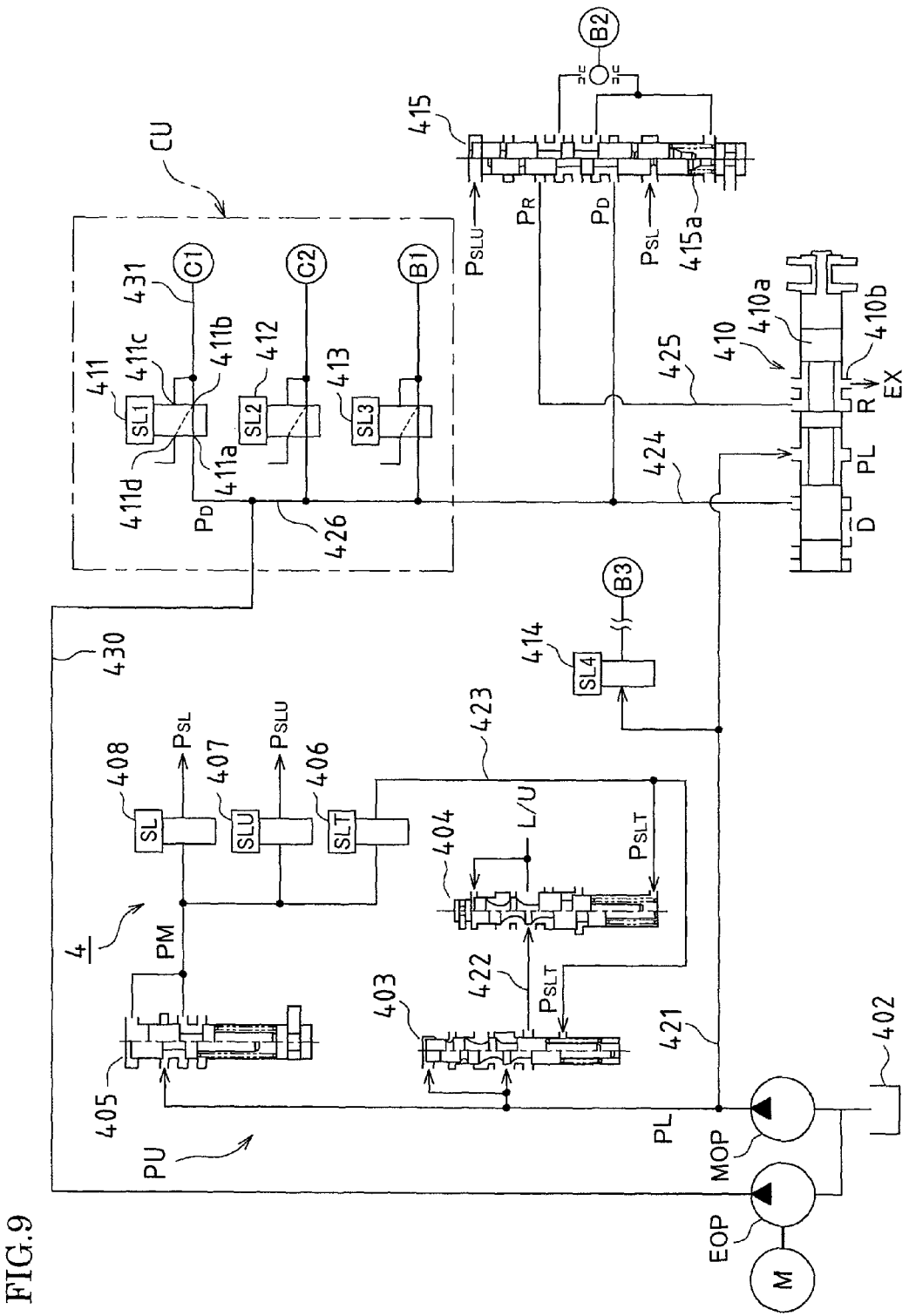
FIG. 9 is a circuit configuration diagram showing part of a hydraulic pressure control circuit in Embodiment 4.

FIG. 9 is a circuit configuration diagram showing part of a hydraulic pressure control circuit in the present embodiment.

As shown in FIG. 9, the shunt hydraulic pressure supply passage 430, which is connected to the discharge side of the electrical oil pump EOP, is connected to the hydraulic pressure passage 426 on the upstream side (the manual shift valve 410 side) of the linear solenoid (SL1) 411 in the friction engaging unit CU. In this case as well, the shunt hydraulic pressure supply passage 430 is connected to the friction engaging unit CU without being connected to the primary regulator valve 403, the secondary regulator valve 404, the modulator valve 405, and the like that are described above. For this reason, the configuration is such that the hydraulic pressure from the electrical oil pump EOP can be supplied directly to the friction engaging unit CU via the shunt hydraulic pressure supply passage 430. In this way, in the present embodiment as well, oil from the electrical oil pump EOP does not pass through various types of valves such as the primary regulator valve 403, thus avoiding occurrences of pressure loss and oil leakage in the various type of valves.

In the present embodiment, when the idle reduction state described above is entered, the spool valve 410a of the manual shift valve 410 is forcibly switched to the R range position. Accordingly, the D port connecting to the D range pressure oil passage 424 is closed, and the D range pressure oil passage 424 is thereby obstructed from the first line-pressure oil passage 421, the R range pressure oil passage 425, and the drain port 410b.

Specifically, in accordance with the idle reduction signal output from the idle reduction controller 110, the electrical oil pump EOP is driven, the motor 501 of the shift range switching mechanism 500 is also driven, and the detent plate 506 is forcibly pivoted to the R range position. Accordingly, the spool valve 410a of the manual shift valve 410 moves to the R range position, and the D port connecting to the D range pressure oil passage 424 is closed, and therefore the forced closure state is entered.

Also, in this case, the switching state of the linear solenoid (SL1) 411 is the state in which the input port 411a and the output port 411b are in communication (the switching state shown by a solid line in FIG. 9). On the other hand, the switching states of the linear solenoid (SL2) 412 and the linear solenoid (SL3) 413 are the states in which the output ports and the drain ports thereof are in communication (the switching state shown by a broken line in FIG. 9). In other words, the input ports are obstructed.

Accordingly, the hydraulic oil discharged from the electrical oil pump EOP is directly supplied to the friction engaging unit CU via the shunt hydraulic pressure supply passage 430, and thereafter acts on the hydraulic pressure servo of the first clutch C1 via the linear solenoid (SL1) 411, thus engaging the first clutch C1. In other words, the first clutch C1 is engaged in preparation for cancellation of the idle reduction state and startup of the vehicle. In this case, although the hydraulic oil discharged from the electrical oil pump EOP flows to the D range pressure oil passage 424 via the friction engaging unit CU and the hydraulic pressure passage 426, the spool valve 410a of the manual shift valve 410 is in the R range position as described above, and the manual shift valve 410 is in the forced closure state in which the D port connecting to the D range pressure oil passage 424 is obstructed. For this reason, oil is prevented from flowing into the hydraulic pressure control unit PU, and it is possible to stably and sufficiently ensure the engaging force of the first clutch C1.

Also, similarly to the solenoid in Embodiment 3 described above, in the present embodiment as well, the linear solenoid (SL1) 411 is a solenoid that is not caused to enter the forced closure state, and therefore the switching operation of the linear solenoid (SL1) 411 can be a conventional structure in which switching can be performed between a state in which the output port 411b and the drain port 411d are in communication, and the input port 411a and the output port 411b are obstructed, and a state in which the output port 411b and the drain port 411d are obstructed, and the input port 411a and the output port 411b are in communication. In other words, there is no need for a configuration in which it is possible to achieve the forced closure state in which the output port 411b and the feedback port 411c are not in communication with either of the input port 411a and the drain port 411d. Furthermore, with the present embodiment, hydraulic pressure can be supplied from the upstream side of the linear solenoid (SL1) 411 during idle reduction, and therefore the control of the linear solenoid (SL1) 411 may also be control similar to that in conventional technology. For this reason, the present embodiment eliminates the need to make design modifications for any of the valves, and eliminates the need to make modifications from conventional technology for operations for controlling the linear solenoid (SL1) 411.

Other Embodiments

Described in the above embodiments are cases in which the present invention is applied to an FF vehicle including the automatic transmission 3 having six forward gear stages to which the gear stage can be changed. The present invention is not limited to this, and can be applied to a vehicle including an automatic transmission 3 having five forward gear stages, eight forward gear stages, or the like to which the gear stage can be changed, an FR (Front-engine, Rear-drive) type of vehicle, or a four-wheel drive vehicle. Also, the transmission may be configured as a CVT (Continuously Variable Transmission), or an SMT (Sequential Manual Transmission) in which an actuator such as an electrical motor or a hydraulic pressure cylinder has been added onto the configuration of a manual transmission.

Also, although the cases of applying the present invention to a vehicle including a gasoline engine has been described in the above embodiments, the present invention is also applicable to a vehicle including another type of engine such as a diesel engine. Also, besides an engine (internal combustion engine), the power source of the vehicle may be an electrical motor or a hybrid type of power source that includes both an engine and an electrical motor.

Also, although the case of using the shift switch 530 including the shift lever 531 as the shift switching apparatus 5 has been described, the present invention is also applicable to a vehicle including a shift-by-wire system automatic transmission using a shift switch configured by, for example, a button switch.

Also, cases of applying the electrical oil pump EOP as the hydraulic pressure supply source for supplying hydraulic pressure to the first clutch C1 (startup clutch) at the time of idle reduction are described in the above embodiments. The present invention is not limited to this, and the first clutch C1 may be engaged with use of hydraulic pressure from the mechanical oil pump MOP at the time of idle reduction cancellation. In this case, the discharge line of the mechanical oil pump MOP is branched, and one of the branch lines is connected to the friction engaging unit CU as the shunt hydraulic pressure supply passage. Also, a switching valve for switching between the branched discharge lines is provided, and the branch line that is the shunt hydraulic pressure supply passage is caused to be in communication with the mechanical oil pump MOP at the time of idle reduction. With this configuration, the mechanical oil pump MOP does not produce hydraulic pressure unless the engine 1 is being driven, and therefore the operation for engaging the first clutch C1 is performed after the engine 1 is driven, but since oil discharged from the mechanical oil pump MOP is rapidly supplied to the friction engaging unit CU via the shunt hydraulic pressure supply passage after the idle reduction cancellation as described above, the first clutch C1 is engaged within a short time period after the idle reduction cancellation, thus enabling favorably ensuring startup performance.

Furthermore, an accumulator (accumulation apparatus) included in a hydraulic pressure circuit may be applied as the hydraulic pressure supply source for supplying hydraulic pressure to the first clutch C1 (startup clutch) at the time of idle reduction. Specifically, the accumulator and the friction engaging unit CU are caused to be in communication via the shunt hydraulic pressure supply passage, a predetermined hydraulic pressure is accumulated by supplying oil from the mechanical oil pump MOP to the accumulator during driving of the engine 1, and by releasing the accumulator at the time of idle reduction, hydraulic pressure is supplied to the friction engaging unit CU via the shunt hydraulic oil supply passage, thus engaging the first clutch C1.

The present invention can be implemented in various other forms without departing from the spirit or principal features of the present invention. The embodiments described above are therefore nothing more than illustrative in every respect, and should not be interpreted in a limiting way. The scope of the present invention is defined by the scope of the claims, and should not be restricted to the foregoing description in any way. Furthermore, all variations and modifications within a scope equivalent to the scope of the claims are encompassed in the scope of the present invention.

Note that this application claims priority on Japanese Patent Application No. 2008-264493 filed in Japan on Oct. 10, 2008. The entire content of the above application is hereby incorporated in the present application by reference. Also, all of the literature cited in the present description is hereby specifically incorporated in the present application by reference.

REFERENCE SIGNS LIST 1 engine (internal combustion engine)
3 automatic transmission
410 manual shift valve
410a spool valve
411 linear solenoid
411a input port
411b output port
416 duty solenoid
424 D range pressure oil passage (hydraulic pressure passage)
430 shunt hydraulic pressure supply passage
431 hydraulic pressure passage
5 shift switching apparatus
501 motor (actuator)
C1 first clutch (startup friction engaging element)
CU friction engaging unit
PU hydraulic pressure control unit
M motor (electrical motor) EOP electrical oil pump (hydraulic pressure supply source)

The invention claimed is:

1. A hydraulic pressure supply control apparatus provided in an automobile that performs internal combustion engine automatic stop control in which driving of an internal combustion engine is stopped in a case in which a predetermined internal combustion engine automatic stop condition is established, the hydraulic pressure supply control apparatus comprising:
 a friction engaging unit including a startup friction engaging element;
 a hydraulic pressure control unit for hydraulic pressure adjustment that is connected to the friction engaging unit via a first hydraulic pressure passage;
 a hydraulic pressure supply source that supplies hydraulic pressure for engaging the startup friction engaging element;
 a shunt hydraulic pressure supply passage that directly supplies hydraulic pressure from the hydraulic pressure supply source to the friction engaging unit without causing the hydraulic pressure to pass through the hydraulic pressure control unit; and
 a valve mechanism closing portion that, when the internal combustion engine automatic stop control is executed, forcibly causes at least one of a plurality of existing valve mechanisms respectively included in the friction engaging unit and the hydraulic pressure control unit to enter a closed state so as to suppress a flow of hydraulic oil from the hydraulic pressure supply source into the hydraulic pressure control unit via the friction engaging unit.

2. The hydraulic pressure supply control apparatus for the automobile according to claim 1,
 wherein the hydraulic pressure supply source is an electrical oil pump driven by an electrical motor, and is configured so as to engage the startup friction engaging element by being driven in accordance with a start of the internal combustion engine automatic stop control.

3. The hydraulic pressure supply control apparatus for the automobile according to claim 2,
 wherein the friction engaging unit further comprises, in addition to the startup friction engaging element, a solenoid valve that switches supply and non-supply of hydraulic pressure to the startup friction engaging element, the shunt hydraulic pressure supply passage is connected to a second hydraulic pressure passage between the startup friction engaging element and the solenoid valve, and the valve mechanism closing portion is configured so as to, when the internal combustion engine automatic stop control is executed, forcibly cause the solenoid valve to enter a closed state.

4. The hydraulic pressure supply control apparatus for the automobile according to claim 3, wherein the solenoid valve is a linear solenoid valve.

5. The hydraulic pressure supply control apparatus for the automobile according to claim 3, wherein the solenoid valve is a duty solenoid valve.

6. The hydraulic pressure supply control apparatus for the automobile according to claim 2, wherein the friction engaging unit further comprises, in addition to the startup friction engaging element, a solenoid valve that switches supply and non-supply of hydraulic pressure to the startup friction engaging element, the shunt hydraulic pressure supply passage is connected to a second hydraulic pressure passage between the startup friction engaging element and an output port of the solenoid valve, and the valve mechanism closing portion is configured so as to, when the internal combustion engine automatic stop control is executed, cause the solenoid valve to enter an open state in which the output port and an input port are in communication, and also forcibly cause said one of the plurality of valve mechanisms to enter the closed state, wherein said one of the plurality of valve mechanisms is included in the hydraulic pressure control unit and is directly connected to the input port of the solenoid valve by the first hydraulic pressure passage.

7. The hydraulic pressure supply control apparatus for the automobile according to claim 6, wherein the hydraulic pressure supply control apparatus is provided in an automatic transmission comprising a by-wire system shift switching apparatus that switches a shift range by an actuator, and said one of the plurality of valve mechanisms forcibly caused to enter the closed state is a manual shift valve in which a spool can be moved by the actuator.

8. The hydraulic pressure supply control apparatus for the automobile according to claim 2, wherein the friction engaging unit further comprises, in addition to the startup friction engaging element, a solenoid valve that switches supply and non-supply of hydraulic pressure to the startup friction engaging element, the shunt hydraulic pressure supply passage is connected to the first hydraulic pressure passage between an input port of the solenoid valve and the hydraulic pressure control unit, and the valve mechanism closing portion is configured so as to, when the internal combustion engine automatic stop control is executed, cause the solenoid valve to enter an open state in which an output port and the input port are in communication, and also forcibly cause said one of the plurality of valve mechanisms to enter the closed state, wherein said one of the plurality of valve mechanisms is included in the hydraulic pressure control unit and is directly connected to the input port of the solenoid valve by the first hydraulic pressure passage.

9. The hydraulic pressure supply control apparatus for the automobile according to claim 8, wherein the hydraulic pressure supply control apparatus is provided in an automatic transmission comprising a by-wire system shift switching apparatus that switches a shift range by an actuator, and said one of the plurality of valve mechanisms forcibly caused to enter the closed state is a manual shift valve in which a spool can be moved by the actuator.

10. The hydraulic pressure supply control apparatus for the automobile according to claim 1, wherein the friction engaging unit further comprises, in addition to the startup friction engaging element, a solenoid valve that switches supply and non-supply of hydraulic pressure to the startup friction engaging element, the shunt hydraulic pressure supply passage is connected to a second hydraulic pressure passage between the startup friction engaging element and the solenoid valve, and the valve mechanism closing portion is configured so as to, when the internal combustion engine automatic stop control is executed, forcibly cause the solenoid valve to enter a closed state.

11. The hydraulic pressure supply control apparatus for the automobile according to claim 10, wherein the solenoid valve is a linear solenoid valve.

12. The hydraulic pressure supply control apparatus for the automobile according to claim 10, wherein the solenoid valve is a duty solenoid valve.

13. The hydraulic pressure supply control apparatus for the automobile according to claim 1, wherein the friction engaging unit further comprises, in addition to the startup friction engaging element, a solenoid valve that switches supply and non-supply of hydraulic pressure to the startup friction engaging element, the shunt hydraulic pressure supply passage is connected to a second hydraulic pressure passage between the startup friction engaging element and an output port of the solenoid valve, and the valve mechanism closing portion is configured so as to, when the internal combustion engine automatic stop control is executed, cause the solenoid valve to enter an open state in which the output port and an input port are in communication, and also forcibly cause said one of the plurality of valve mechanisms to enter the closed state, wherein said one of the plurality of valve mechanisms is included in the hydraulic pressure control unit and is directly connected to the input port of the solenoid valve by the first hydraulic pressure passage.

14. The hydraulic pressure supply control apparatus for the automobile according to claim 13, wherein the hydraulic pressure supply control apparatus is provided in an automatic transmission comprising a by-wire system shift switching apparatus that switches a shift range by an actuator, and said one of the plurality of valve mechanisms forcibly caused to enter the closed state is a manual shift valve in which a spool can be moved by the actuator.

15. The hydraulic pressure supply control apparatus for the automobile according to claim 1, wherein the friction engaging unit further comprises, in addition to the startup friction engaging element, a solenoid valve that switches supply and non-supply of hydraulic pressure to the startup friction engaging element, the shunt hydraulic pressure supply passage is connected to the first hydraulic pressure passage between an input port of the solenoid valve and the hydraulic pressure control unit, and the valve mechanism closing portion is configured so as to, when the internal combustion engine automatic stop control is executed, cause the solenoid valve to enter an open state in which an output port and the input port are in communication, and also forcibly cause said one of the plurality of valve mechanisms to enter the closed state, wherein said one of the plurality of valve mechanisms is included in the hydraulic pressure control unit and is directly connected to the input port of the solenoid valve by the first hydraulic pressure passage.

16. The hydraulic pressure supply control apparatus for the automobile according to claim 15, wherein the hydraulic pressure supply control apparatus is provided in an automatic transmission comprising a by-wire system shift switching apparatus that switches a shift range by an actuator, and said one of the plurality of valve mechanisms forcibly caused to enter the closed state is a manual shift valve in which a spool can be moved by the actuator.

\* \* \* \* \*